US011325282B2

(12) United States Patent
Wang et al.

(10) Patent No.: US 11,325,282 B2
(45) Date of Patent: May 10, 2022

(54) METHOD OF MANUFACTURING A COMPOSITE WORKPIECE

(71) Applicant: The Boeing Company, Chicago, IL (US)

(72) Inventors: Xiaoxi Wang, Mukilteo, WA (US); Gary Ernest Georgeson, Tacoma, WA (US); Jonathan A. Santiago, Seattle, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 16/459,505

(22) Filed: Jul. 1, 2019

(65) Prior Publication Data
US 2021/0001519 A1 Jan. 7, 2021

(51) Int. Cl.
  *B29C 35/02* (2006.01)
  *B29C 61/04* (2006.01)
  *B29C 44/12* (2006.01)
  *B29L 31/30* (2006.01)

(52) U.S. Cl.
  CPC .......... *B29C 35/02* (2013.01); *B29C 44/1271* (2013.01); *B29C 61/04* (2013.01); *B29L 2031/3076* (2013.01)

(58) Field of Classification Search
  None
  See application file for complete search history.

(56) References Cited

U.S. PATENT DOCUMENTS

| 3,755,031 | A | * | 8/1973 | Hoffman | B29C 44/14 156/79 |
|---|---|---|---|---|---|
| 4,302,549 | A | | 11/1981 | Crowley | |
| 4,303,756 | A | | 12/1981 | Kajimura et al. | |
| 4,782,098 | A | | 11/1988 | Allen et al. | |
| 5,051,224 | A | * | 9/1991 | Donatelli | C08J 3/12 264/257 |
| 5,102,604 | A | | 4/1992 | Sidles et al. | |
| 5,230,844 | A | * | 7/1993 | Macaire | A63C 5/12 264/257 |
| 5,273,696 | A | * | 12/1993 | Cazaillon | A63C 5/12 264/257 |
| 6,117,376 | A | * | 9/2000 | Merkel | B64C 3/24 264/46.5 |
| 7,052,572 | B2 | * | 5/2006 | Miura | B29C 43/10 156/286 |
| 8,540,921 | B2 | | 9/2013 | Senibi et al. | |

(Continued)

OTHER PUBLICATIONS

Praller, Andreas, "Foaming Plastics with Inert Gases", Kunststoffe Plast Europe, Jun. 2005, 4 pages.
The Linde Group, "Facts About Foaming Plastics with Inert Gases", Linde North America, Inc. Brochure, 2012, 12 pages.

(Continued)

*Primary Examiner* — Edmund H Lee
(74) *Attorney, Agent, or Firm* — Kolisch Hartwell, P.C.

(57) ABSTRACT

Methods of manufacturing composite workpieces that include positioning a heat-generating element proximate to an uncured composite workpiece, triggering the heat-generating element to produce an exothermic chemical reaction or exothermic physical reaction so that the temperature of the uncured composite workpiece is raised to a predetermined first temperature, and curing the composite workpiece while it is at a temperature that is at least the predetermined first temperature.

20 Claims, 13 Drawing Sheets

(56) References Cited

U.S. PATENT DOCUMENTS

| | | |
|---|---|---|
| 8,790,565 B2 | 7/2014 | Miller |
| 2006/0175730 A1* | 8/2006 | Merkel .................. B29C 70/44 |
| | | 264/257 |
| 2007/0080481 A1 | 4/2007 | Kismarton |
| 2008/0111024 A1 | 5/2008 | Lee et al. |
| 2010/0140842 A1 | 6/2010 | Nelson et al. |
| 2011/0308711 A1 | 12/2011 | Coleman et al. |
| 2013/0134621 A1 | 5/2013 | Tsotsis et al. |
| 2014/0299257 A1 | 10/2014 | Pearson et al. |
| 2020/0039156 A1 | 2/2020 | Wang et al. |
| 2020/0148851 A1 | 5/2020 | Queiroz Da Fonseca et al. |
| 2020/0207033 A1 | 7/2020 | Wang et al. |
| 2021/0001571 A1 | 1/2021 | Santiago et al. |

OTHER PUBLICATIONS

Akzo Nobel NV, Expancel Microspheres: The World's Favorite Secret Ingredient, 2016, 16 pages.
Akzo Nobel NV, Product Specification for Expancel Microspheres, Expancel MB, Nov. 2017, 2 pages.
Easy Composite Ltd., Beginner's Guide to Out of Autoclave Carbon Fibre, downloaded from Internet on May 5, 2019, at https://www.easycomposites.co.uk/downloads/TDS/EC-TDS-Beginners-Guide-to-Prepreg-Carbon-Fibre.pdf, 21 pages.
U.S. Patent and Trademark Office, Final Office Action regarding U.S. Appl. No. 16/053,733, dated Dec. 16, 2020, 14 pages.
U.S. Patent and Trademark Office, Non-Final Office Action regarding U.S. Appl. No. 16/053,733, dated Sep. 3, 2020, 20 pages.
U.S. Patent and Trademark Office, Non-Final Office Action regarding U.S. Appl. No. 16/459,492, dated Jun. 15, 2021, 37 pages.

* cited by examiner

METHOD OF MANUFACTURING A COMPOSITE WORKPIECE

CROSS-REFERENCE TO RELATED APPLICATIONS

The present application hereby incorporates by reference, for all purposes, U.S. patent application Ser. No. 16/053,733, filed Aug. 2, 2018 by The Boeing Company and issued as U.S. Pat. No. 11,046,027 on Jun. 29, 2021.

FIELD

This disclosure relates to systems and methods for manufacturing composite parts. More specifically, the disclosed examples relate to composite part manufacture using heat-generating tooling.

INTRODUCTION

Engineered composite materials are used in many applications, typically where the composite material can be made stronger, lighter, and/or less expensively than a traditional material. A variety of modern composite materials exist, but the most common are varieties of fiber-reinforced polymer composites, such as fiberglass or carbon fiber composites.

For many composite materials, the manufacturing process includes curing the fiber-reinforced matrix material, typically under elevated temperatures and pressures. An industrial oven is often used for curing composite materials, as an oven permits the application of the necessary elevated temperatures needed for curing composite materials. The heating of the composite materials is typically combined with the application of sufficient pressure to help consolidate the composite material, such as by using a vacuum bag or a placing the composite material in a mold and using a press to apply pressure.

Unfortunately, for processes requiring an autoclave, a bottleneck may be created in the manufacturing process, with throughput dependent upon the capacity of the ovens available, and requiring transport of either raw materials or preassembled but uncured components to the oven, and subsequent transport of the cured components from the oven to where they will be utilized.

So-called "Out of Autoclave" composite manufacturing (or OOA) provides an alternative to traditional industrial curing processes typically used for composite manufacture. An ideal OOA curing process would achieve the same quality of composite component as a process employing an industrial oven, without requiring the expense, the space, and the maintenance of a traditional oven.

SUMMARY

The present disclosure provides systems, apparatus, and methods relating to heat-generating tooling tooling for curing composite structures.

In some examples, the present disclosure relates to methods of manufacturing a composite workpiece that include positioning a heat-generating element proximate to an uncured composite workpiece, where the heat-generating element is capable of undergoing an exothermic chemical reaction when activated, or capable of undergoing an exothermic physical reaction when triggered. The method further includes triggering the heat-generating element to produce the exothermic chemical reaction or exothermic physical reaction so that the temperature of the uncured composite workpiece is raised to at least a predetermined first temperature, and curing the composite workpiece while the composite workpiece is at a temperature that is at least the predetermined first temperature.

In some examples, the present disclosure relates to methods of manufacturing a composite component that include positioning a heat-generating element proximate to an uncured composite aircraft component, where the heat-generating element capable of undergoing an exothermic chemical reaction when activated or capable of undergoing an exothermic physical reaction when triggered; and triggering the heat-generating element to produce the exothermic chemical reaction or exothermic physical reaction so that the temperature of the uncured composite aircraft component is raised to at least a predetermined first temperature at which the uncured composite aircraft component will be cured.

Features, functions, and advantages can be achieved independently in various examples of the present disclosure, or can be combined in yet other examples, further details of which can be seen with reference to the following description and drawings.

DETAILED DESCRIPTION

Figure 2:
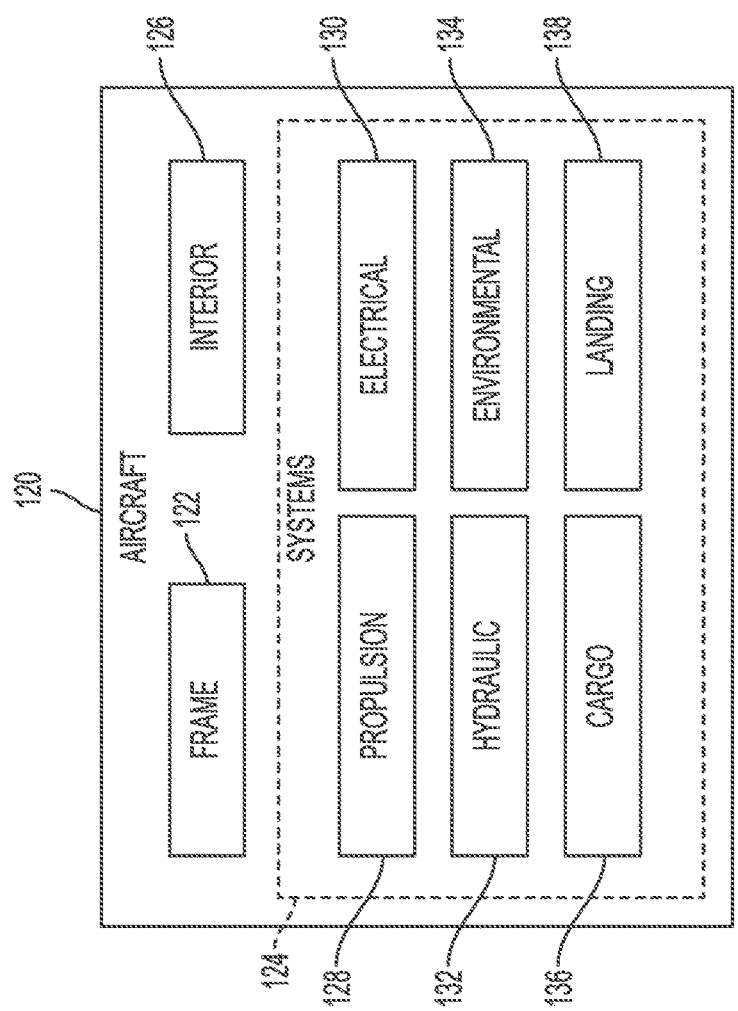
FIG. 2 is a schematic diagram of an illustrative aircraft.

Various aspects and examples of a heat-generating tooling system, as well as related methods, are described below and illustrated in the associated drawings. Unless otherwise specified, a heat-generating tooling system, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

"Consisting of" (and conjugations thereof) is used to mean excluding any additional and unrecited elements or method steps that are not specified.

"Consisting essentially of" (and conjugations thereof) is used to mean are used interchangeably to mean including but not necessarily limited to those additional, unrecited elements or method steps that do not materially affect the basic characteristics of the recited apparatus or method.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

"Expandable" means able to be expanded, or having the potential or capability of increasing in size and/or volume. A substance or discrete element that is expandable may be capable of increasing in size or volume symmetrically, or asymmetrically. Where the expandable substance is capable of symmetric expansion, the substance undergoes an a substantially equivalent degree of expansion along each axis. Where the expandable substance exhibits asymmetric expansion, the substance can undergo a greater relative expansion along a first axis, or first and second axes, than along a different axis.

Overview

In general, a heat-generating tooling system includes a heat-generating element configured to be capable of raising the temperature of an uncured composite workpiece to at least a predetermined first temperature, where the predetermined first temperature is a temperature sufficient to cure the uncured composite workpiece.

The heat-generating element is typically placed so that it is at least proximate to the uncured composite workpiece. That is, the heat-generating element can abut the uncured composite workpiece, or be placed adjacent to, close to, or otherwise near the uncured composite workpiece. The heat-generating element can be considered proximate to the uncured composite workpiece when the heat-generating element is capable of heating the uncured composite workpiece when activated.

The proximate heat-generating element can be triggered so that it will undergo an exothermic process, thereby raising the temperature of the uncured composite workpiece. The heat-generating element can be capable of undergoing an exothermic chemical reaction, and triggering the heat-generating element can include initiating the exothermic chemical reaction. Alternatively, or in addition, the heat-generating element can be capable of undergoing an exothermic physical reaction, such as a phase change, and triggering the heat-generating element can include initiating the physical reaction.

The curing process can be modified by placing the uncured composite workpiece within a container, and adding the heat-generating element to the container adjacent the uncured composite workpiece. In this way, the effect of the heating can be enhanced, and the amount of heat-generating element can be minimized. The selection of an appropriate container can additionally facilitate "out-of-autoclave" curing of composite workpieces, eliminating the need for an industrial oven, and preventing the types of bottlenecks in production flow that can occur result when a production resource is limited.

The curing process can optionally be combined with the application of pressure to the uncured composite workpiece as it cures. Any means of applying pressure to the composite workpiece as it is heated is a suitable means of applying pressure. Where the disclosed systems and methods are used for out-of-autoclave manufacturing of composites, it may be particularly helpful to employ a containerfor the uncured composite workpiece that is a constraining container, and to add an expandable element to the constraining container with the heat-generating element, so that the uncured composite workpiece can be subjected to pressure as it is heated. In such cases, the uncured composite workpiece can be disposed in the constraining container upon a mold, or other rigid form, while the workpiece is heated and the requisite pressure is applied by a suitable expandable element.

The disclosed systems and methods are useful for a variety of composite materials, used in manufacturing desired components for any suitable industrial application. The present systems and methods may be particularly useful for curing composite workpieces a unique or awkward shape that may not lend itself to process in an industrial oven or autoclave.

For example, modern aircraft can employ composite stiffeners or stringers to confer stiffness and strength to fuselage panels or other structural components of the aircraft. For strength and rigidity, a stiffener may exhibit a concave cross-section with projecting extensions. The stiffener may additionally incorporate an overall curvature in order to match the curve of the fuselage to which it will be attached. Yet further, the stiffener may include one or more bends, or joggles, in order to accommodate one or more aircraft systems. Due to these constraints, the resulting stiffener may have a size and shape that makes it difficult to transport to and from an industrial autoclave, or may even prevent the autoclave from accommodating the uncured stiffener.

However, such a composite stiffener can be readily accommodated by a constraining container specifically sized and shaped for that stiffener, and the uncured composite stiffener can be disposed upon a rigid form constructed so as to define and incorporate the desired cross-sectional profile, the desired curvature, and the desired joggles in the stiffener. The composite stiffener can then readily be cured while it is heated by a suitable heat-generating element.

EXAMPLES, COMPONENTS, AND ALTERNATIVES

The following sections describe selected aspects of exemplary removable heat-generating tooling, as well as related systems and/or methods. The examples in these sections are intended for illustration and should not be interpreted as limiting the entire scope of the present disclosure. Each section can include one or more distinct embodiments or examples, and/or contextual or related information, function, and/or structure.

A. Illustrative Applications and Associated Methods

The presently disclosed systems and methods may be used in any suitable industry, for the manufacture of any desired composite material. Although the examples provided herein are described in the context of aircraft manufacturing and service, these are merely illustrative examples, and should not be considered limiting the applicability of the disclosed systems and methods in any way.

Figure 1:
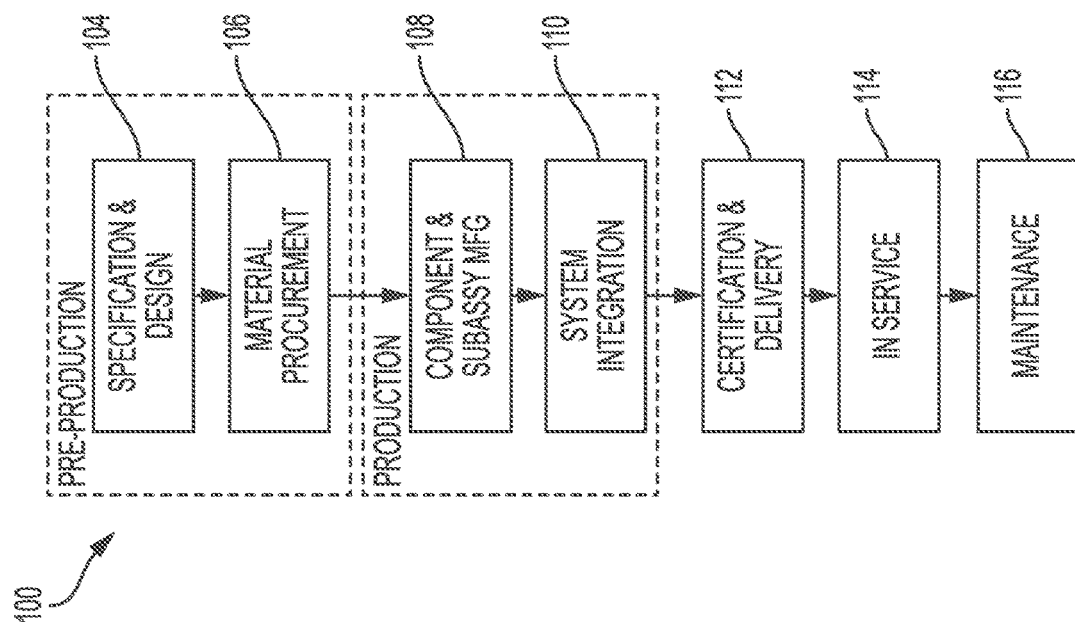
FIG. 1 is a flowchart depicting steps of an illustrative aircraft manufacturing and service method.
Figure 3:
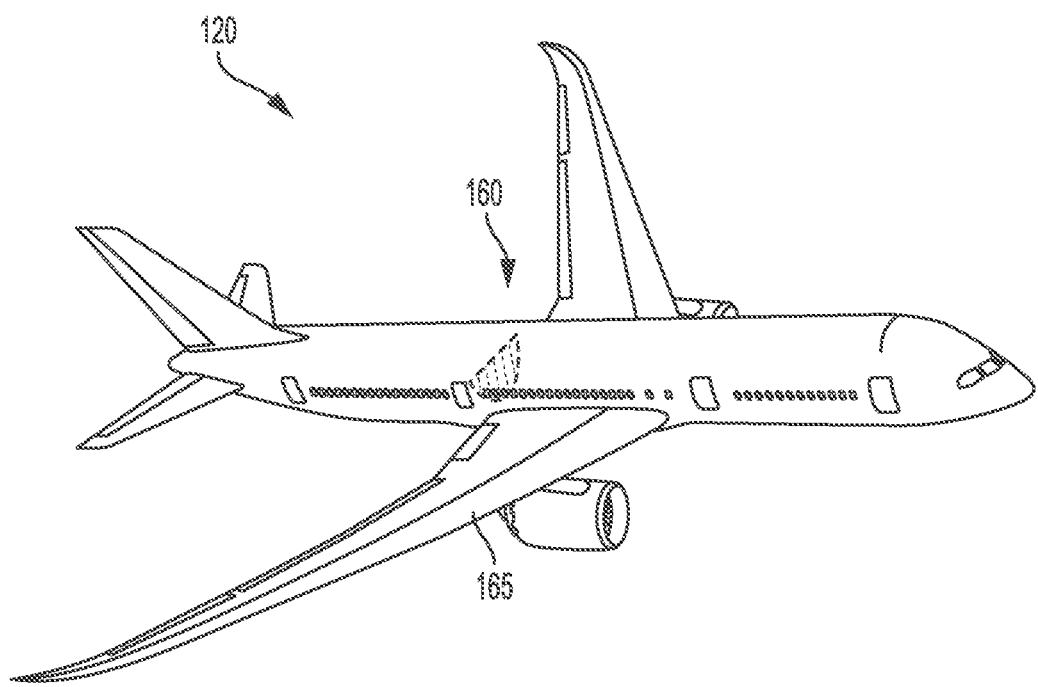
FIG. 3 is an isometric view of an illustrative aircraft.

FIGS. 1-3 depict an illustrative aircraft manufacturing and service method 100 and an illustrative aircraft 120. Method 100 includes a plurality of processes, stages, or phases. During pre-production, method 100 can include a specification and design phase 104 of aircraft 120 and a material procurement phase 106. During production, a component and subassembly manufacturing phase 108 and a system integration phase 110 of aircraft 120 can take place. Thereafter, aircraft 120 can go through a certification and delivery phase 112 to be placed into in-service phase 114. While in service (e.g., by an operator), aircraft 120 can be scheduled for routine maintenance and service 116 (which can also include modification, reconfiguration, refurbishment, and so on of one or more systems of aircraft 120). While the examples described herein relate generally to component and subassembly manufacturing phase 108 of aircraft 120, they can be practiced at other stages of method 100.

Each of the processes of method 100 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

As shown in FIGS. 2-3, aircraft 120 produced by illustrative method 100 can include a frame 122 with a plurality of systems 124 and an interior 126. Examples of plurality of systems 124 include one or more of a propulsion system 128, an electrical system 130, a hydraulic system 132, an environmental system 134, a cargo system 136, and a landing system 138. Each system can comprise various subsystems, such as controllers, processors, actuators, effectors, motors, generators, etc., depending on the functionality involved. Any number of other systems can be included. Although an aerospace example is shown, the principles disclosed herein can be applied to other industries, such as the automotive industry, rail transport industry, and nautical transport industry. Accordingly, in addition to aircraft 120, the principles disclosed herein can apply to other structures, such as other vehicles, e.g., land vehicles, marine vehicles, etc.

Apparatuses and methods shown or described herein can be employed during any one or more of the stages of the manufacturing and service method 100. For example, components or subassemblies corresponding to component and subassembly manufacturing phase 108 can be fabricated or manufactured in a manner suitable for components or subassemblies used while aircraft 120 is operating during in-service phase 114. Also, one or more examples of the apparatuses, methods, or combinations thereof can be utilized during production stages 108 and 110, for example, by substantially expediting assembly of or reducing the cost to manufacture or use aircraft 120. Similarly, one or more examples of the apparatus or method realizations, or a combination thereof, can be utilized, for example and without limitation, during maintenance and service phase 116.

Any component or substructure of an aircraft that lends itself to composite manufacture can be compatible with the illustrative methods and processes described herein, including without limitation structural components, non-structural components, fuselage panels, bulkhead sections, interior panels, substantially aesthetic panels, and the like. In one aspect, the presently described methods are particularly useful for the manufacture of stiffeners, or stringers, used in aircraft manufacture.

Figure 4:
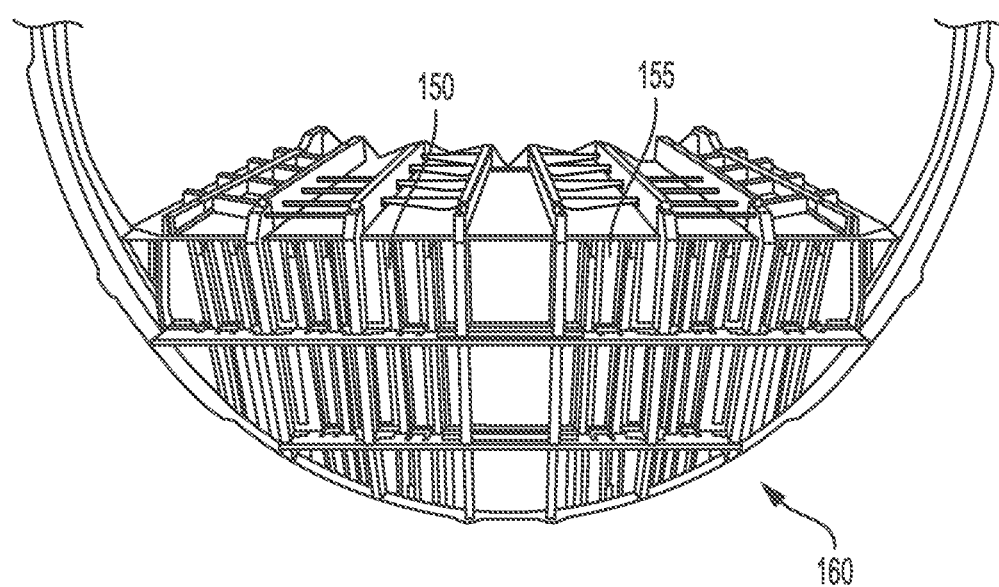
FIG. 4 is a back perspective view of a portion of an illustrative aircraft bulkhead including illustrative stiffeners.
Figure 5:
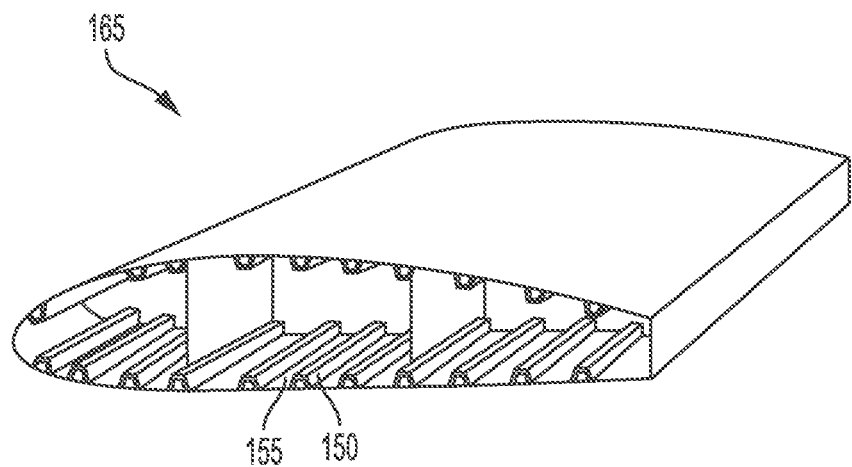
FIG. 5 is a perspective view of a portion of an illustrative aircraft wing including stiffeners.

As shown in FIGS. 3-5, an aircraft 120 can include one or more stiffeners 150 configured to carry loads. In some examples, stiffeners 150 are attached to skins 155 to improve the strength, stiffness, and/or buckling resistance of the skins. Stiffeners 150 can be included in any suitable part of aircraft frame 122 and/or any other suitable part of aircraft 120. FIGS. 3-4 depict stiffeners 150 reinforcing skin 155 in an illustrative aircraft bulkhead 160. FIG. 5 depicts stiffeners 150 reinforcing skin 155 in an illustrative aircraft wing 165.

B. Illustrative Aircraft Stiffener

Figure 6:
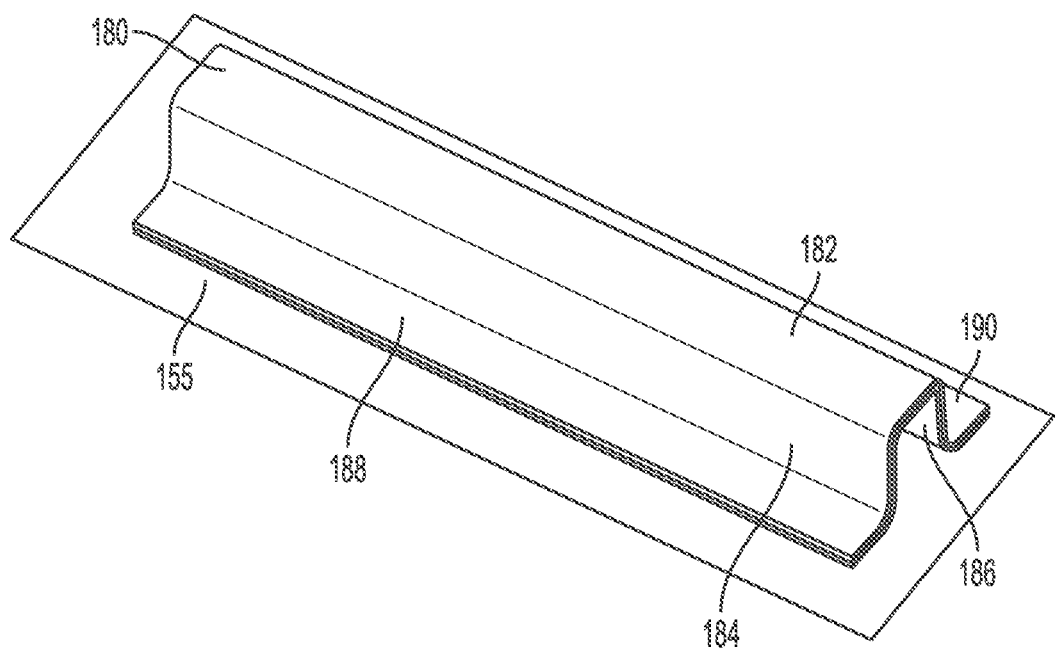
FIG. 6 is a perspective view of an illustrative composite aircraft hat stiffener attached to a skin.
Figure 7:
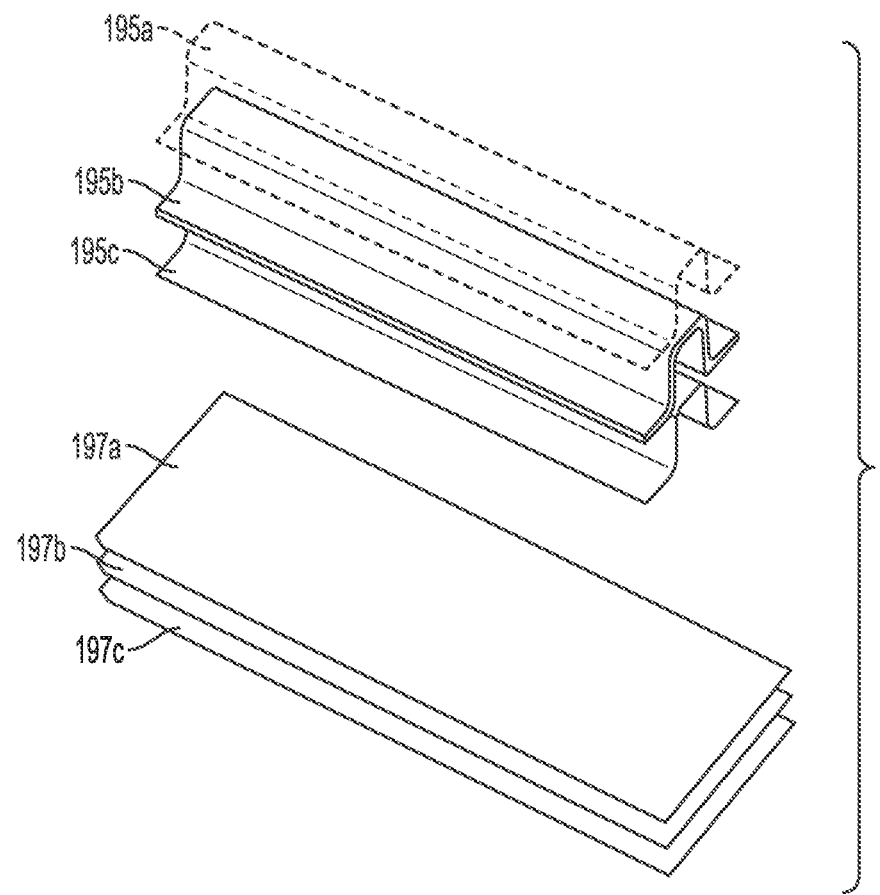
FIG. 7 is an exploded isometric view of the stiffener and skin of FIG. 6.

This section describes illustrative hat stiffener 180, as shown in FIGS. 6-7. Hat stiffener 180 is an example of stiffener 150, described above.

As depicted in FIG. 6, hat stiffener 180 includes a cap section 182 and first and second sidewalls 184 and 186 extending from opposing side portions of the cap section. In the example depicted in FIG. 6, first and second sidewalls 184 and 186 extend from cap section 182 at obtuse angles; in other examples, first and second sidewalls 184 and 186 can form acute angles or substantially right angles with cap section 182. The angle between cap section 182 and first sidewall 184 may or may not be equal to the angle between cap section 182 and second sidewall 186. Cap section 182 can be substantially planar, as depicted in FIG. 6, or can include curved and/or angled portions.

Hat stiffener 180 further includes first flange 188 extending from first sidewall 184, and second flange 190 extending from second sidewall 186. First and second flanges 188 and 190 extend away from each other in opposing directions and can be parallel to cap section 182 (e.g., the first and second flanges can be coplanar and can define a plane that is parallel to a plane generally defined by the cap section). First and second flanges 188 and 190 have respective bottom surfaces that can be attached to skin 155 so that hat stiffener 180 is configured to reinforce, stiffen, and strengthen the skin. A plurality of hat stiffeners 180 can be attached to an expanse of skin 155.

Hat stiffener 180 is a composite part comprising one or more composite layers (also called plies) that are adhered together by curing (e.g., by application of heat and/or pressure). Skin 155 can also be a composite part comprising one or more composite layers. FIG. 7 is an exploded view depicting illustrative composite stiffener layers 195a, 195b, and 195c of hat stiffener 180 and illustrative composite skin layers 197a, 197b, and 197c of skin 155. Alternatively, hat stiffener 180 and/or skin 155 can comprise more composite layers, or fewer composite layers, than are depicted in FIG. 7. Hat stiffener 180 can be attached to skin 155 by curing the stiffener and the skin while they are held together, or by curing the stiffener and the skin separately and then fastening the stiffener to the skin. Hat stiffener 180 and skin 155 can each comprise one or more polymer materials, thermoplastic materials, thermosetting materials, and/or any other suitable materials depending on the desired properties for the finished workpiece.

Figure 8:
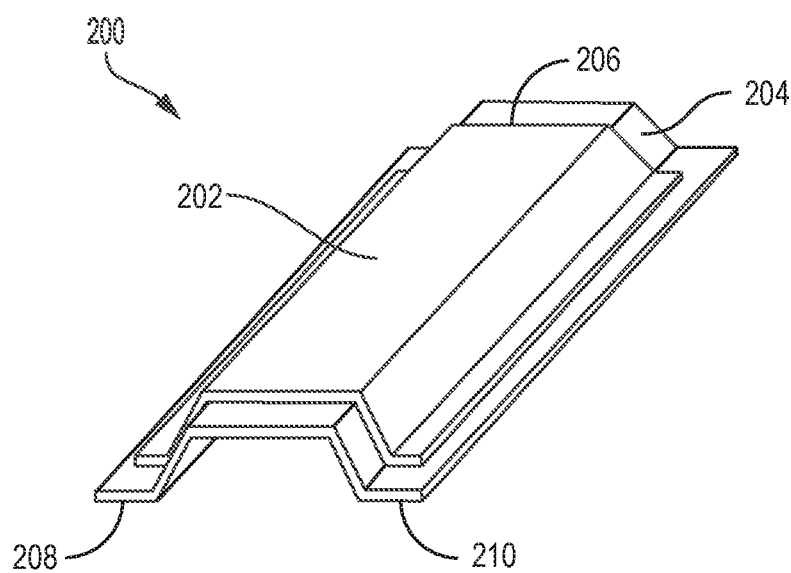
FIG. 8 depicts an illustrative workpiece assembly including an uncured composite workpiece disposed upon a rigid form.
Figure 9:
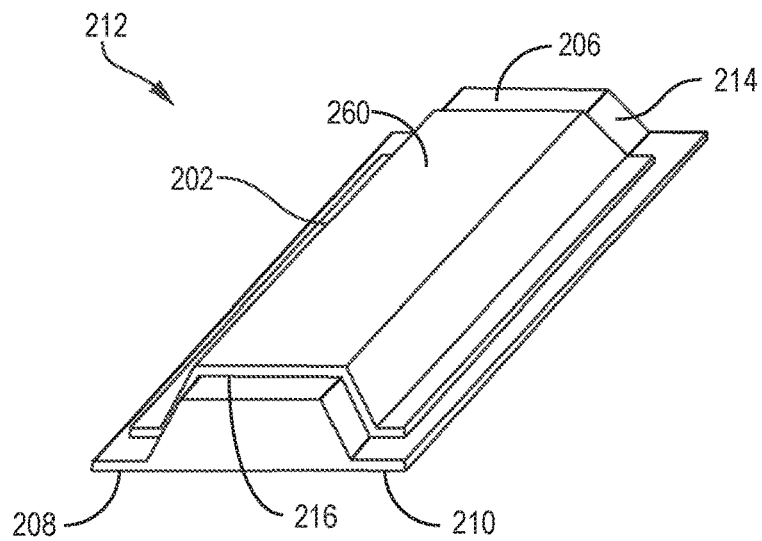
FIG. 9 depicts an illustrative workpiece assembly including an uncured composite workpiece disposed upon a rigid form.

FIG. 8 schematically depicts an assembly 200 that includes an uncured composite workpiece 202 corresponding to an aircraft stiffener, where the uncured composite workpiece 202 is disposed upon an appropriately-shaped rigid form 204. In this example the upper surface 206 of rigid form 204 defines the desired cross-sectional profile of the desired final stiffener, including extensions 208 and 210 to support what will become first flange 188 and second flange 190, respectively. Although rigid form 204 defines a concave shell, any configuration of rigid form having a suitable upper surface upon which the shape of the desired composite workpiece can be formed is an appropriate configuration. For example as shown for assembly 212 of FIG. 9, rigid form 214 (when present) can include a solid form, rather than a concave shell.

Rigid form 214 can be substantially resistant to compression, at least when pressure is applied on upper surface 206 of the rigid form, which contacts an undersurface 216 of uncured composite workpiece 202. In this way pressure applied to the outer surface 260 of uncured composite workpiece 202 acts cooperatively with rigid form 204, 214 to generate compressive force upon workpiece 202.

Rigid form 214 can perform the function of a conventional caul plate, or can be used in conjunction with a conventional caul plate.

C. Heat-Generating Tooling System Overview

Figure 10:
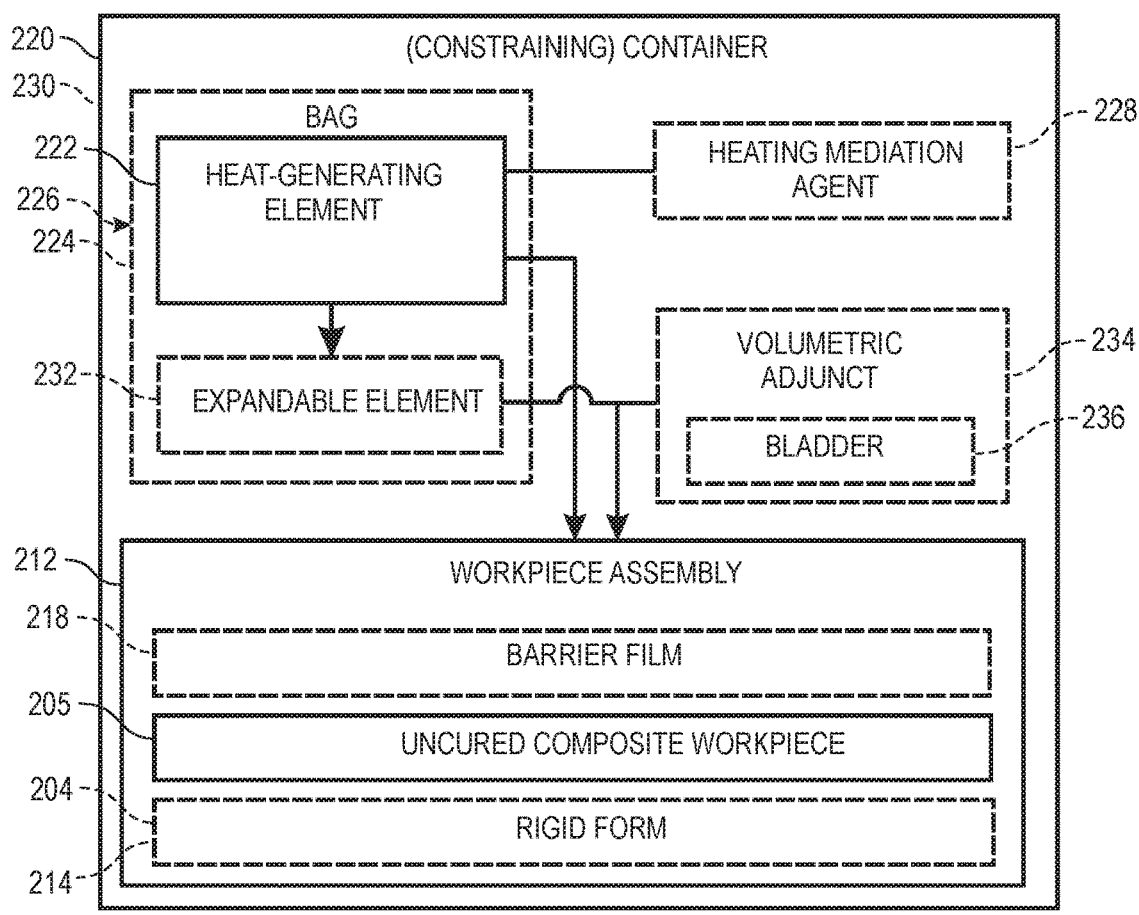
FIG. 10 is an illustrative functional block diagram depicting a container according to the present disclosure, enclosing an uncured composite workpiece in the presence of a heat-generating element.

FIG. 10 depicts a functional block diagram illustrating a container 220 that encloses a workpiece assembly 212 that includes an uncured composite workpiece 205. Uncured composite workpiece 205 is optionally disposed upon a rigid form 214. Container 220 can also include a heat-generating element 222 that is configured to undergo an exothermic chemical reaction or an exothermic physical reaction when triggered, and to thereby raise the temperature of workpiece assembly 212, and so raise the temperature of uncured composite workpiece 205.

Container 220 can optionally further include one or more additional elements selected to facilitate or modify the curing process of workpiece 205, such as one or more bags 224 that can enclose the heat-generating element 222 to form a bag assembly 226, thereby facilitating handling of the heat-generating element 222, as well as the removal of the triggered element after the curing process is substantially complete.

Additional elements that can modify or moderate the heating applied by heat-generating element 222 can include one or more heating mediation agents 228, which can serve to increase, decrease, or otherwise modify the heating effected by heat-generating element 222.

Where it is desirable to apply pressure to workpiece assembly 212 as it is heated by heat-generating element 222 within container 220, the container can be a constraining container 230, and an expandable element 232 can be added to container 220 and heat generating substance 222. Expandable element 232 can be a thermally-expandable element that is configured to undergo expansion when it reaches a predetermined temperature, so that heat-generating element 222 is capable of heating expandable element 232 to at least the predetermined temperature at which expandable element 232 is configured to expand.

The pressure applied by expandable element 232 may optionally be moderated by the addition of one or more volumetric adjuncts 234 to constraining container 230 with expandable element 232, such as volumetrically invariant (i.e. substantially noncompressible) adjuncts, and/or one or more contractible elements (optionally including a bladder 236).

As shown in FIG. 10, a removable barrier film 218 can optionally be applied to an outer surface of uncured composite workpiece 205, typically before heat-generating element 222 is placed proximate to workpiece 205. The presence of barrier film 218 can help minimize or eliminate selected chemical and/or physical interactions between components of container 220 and uncured composite workpiece 205. Barrier film 218 can be selected to be resistant to heat, and to be readily removable after workpiece 205 is cured. Appropriate materials for barrier film 218 can include silicon-based films, polymer-based films, and/or fluorinated polymer-based films.

One or more of the optional additional elements shown in FIG. 10 may be present in container 220, without limitation, and in any combination, as will be discussed in greater detail below.

D. Heat-Generating Element

Heat-generating element 222 is selected so that it is capable of undergoing an exothermic chemical reaction when activated, or capable of undergoing an exothermic physical reaction when triggered. The heat-generating element 222 is further selected to be capable of raising the temperature of uncured composite workpiece 205 to at least a predetermined first temperature at which the uncured composite workpiece can be cured.

Figure 11:
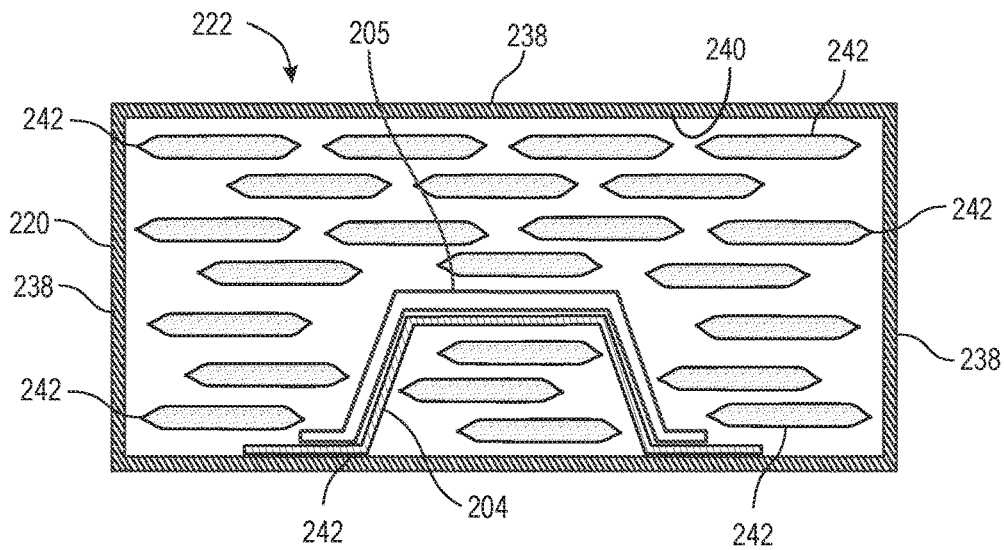
FIG. 11 is a cross-sectional view of an illustrative uncured composite workpiece disposed upon a rigid form within an illustrative container with a plurality of heat-generating packets.

FIG. 11 depicts a container 220 into which has been placed an uncured composite workpiece 205 disposed upon and supported by a rigid form 204, having container walls 238 that define an interior volume 240 surrounding uncured composite workpiece 205. Also placed in container 220 is heat-generating element 222, which is disposed proximate to uncured composite workpiece 205, as well as beneath rigid form 204. As a result, heat-generating element 222 is disposed above, beneath, and around uncured workpiece element 205 to help create even heating of the composite.

Heat-generating element 222 can be added to container 220 as discrete or distinct packages 242 of material. Alternatively, or in addition, heat-generating element 222 can be added to container 220 in the form of a plurality of heat-generating pellets 244.

Heat-generating element 222 can be selected to heat the uncured composite workpiece 205 to at least the predetermined temperature by either undergoing an exothermic (heat-producing) change of state, or undergoing an exothermic (heat-producing) chemical reaction, or a combination thereof, as will be discussed below.

1. Exothermic Chemical Reaction

Where heat-generating element 222 is selected to be capable of generating heat via an exothermic chemical reaction, the heat-generating element typically includes the reactants required for the desired chemical reaction to occur. The chemical reaction itself is typically energetically favorable, and one or more of the requisite reactants can therefore be isolated from the others, in order to prevent the reaction from proceeding until heating is desirable. The desired chemical reaction is typically substantially self-sustaining, so that once the reaction is initiated, either by adding or intermixing the necessary reactants, the reaction will proceed until sufficient heat is generated, and/or until the reaction is substantially complete.

A number of exothermic chemical reactions exist. However, for the purposes of the present systems and methods, an appropriate chemical reaction would one that employs reactants that are relatively inexpensive, and relatively non-hazardous, such as the following exemplary reactions.

A suitable heat-generating reaction that is typically used for flameless heating is the reaction of calcium oxide (or quicklime) with water. This reaction is already used for some self-heating food containers, as calcium oxide reacts vigorously with water to produce heat. The dry calcium oxide and water reactants are typically combined by piercing a wall or membrane separating the reactants. For example, the membrane may be disposed between adjacent compartments enclosing the two reactants. Once mixed, the exothermic reaction proceeds with an enthalpy of reaction of −64.8 kJ/mol:

$$CaO(s) + H_2O(aq) \rightarrow Ca(OH)_2(s) \Delta H = -64.8 \text{ kJ/mol}$$

The combination of one mole of calcium oxide with one mole of water would therefore yield −64.8 kJ of energy in the form of heat. Using the molecular weights for calcium oxide (56.1 grams/mol) and water (18.0 grams/mol), we can calculate that 74.1 grams of combined reactants would be needed to generate 64.8 kJ of heat energy. If the reaction were carried out by adding excess water to the calcium oxide, the water would act as both reactant and solvent, and in addition serve as a heat transfer medium. That is, the reaction would heat the water, and the heated water could be used to heat the uncured composite workpiece 205.

For the purposes of illustration, a heat-generating packet employing the calcium oxide-water reaction could be constructed for use in the presently disclosed systems and methods for manufacturing a composite workpieces. Such a heat-generating packing might include 56.1 grams of dry calcium oxide, with 268 grams of water (or 268 mL of water) in a separate compartment or chamber. When combined, for example by piercing tahe membrane between the two chambers, the reaction will consume 18.0 grams of water, and the remaining 250 grams of water will be heated by the 64.8 kJ of energy released by the reaction.

The specific heat of liquid water is relatively high, at 4,182 J/K/Kg (Joules/degree Kelvin/Kg), but the addition of 64.8 kJ to 250 grams of water will raise the temperature of the 250 grams of water by 62 degrees Celsius. That is, if the water was initially at 20 degrees Celsius, and assuming no loss of heat to the environment, the water would be heated to approximately 82 degrees Celsius, or 180 degrees Fahrenheit. In addition to its heating capabilities, the calcium oxide-water reaction has the additional advantage of using inexpensive reactants. Further, although calcium oxide can be an irritant to skin, it is generally safe, and is sometimes even used as a dietary supplement.

An alternative and suitable heat-generating reaction is the reaction of magnesium metal and water to generate magnesium hydroxide and hydrogen gas. This reaction is employed by the U.S. military to heat military rations using flameless ration heaters (or FRHs). The reaction is slow, however, and FRHs additionally include metallic iron particles and sodium chloride in order to accelerate the rate of the reaction. An exemplary FRH utilizes 7.5 grams of powdered magnesium-iron alloy and 0.5 grams of salt, with the addition of 30 mL of water, to heat a 230 gram meal packet by 56 degrees Celsius (100 degrees Fahrenheit) in approximately 10 minutes. This corresponds to a release of approximately 50 kJ of heat energy at about 80 watts.

Another alternative heat-generating reaction is the oxidation of iron with oxygen. Although the rusting of iron is typically not associated with heat generation, this reaction is used by some portable hand warmers. Such hand-warming packets can include moist, finely-divided iron particles, salt, and optionally appropriate catalysts for the reaction. The packets can additionally include activated charcoal and vermiculite, to help dilute the iron powder to slow the rate of reaction, as well as to diffuse the heat generated by the packet. When the sealed packet is opened, exposing the contents to oxygen, the packet can generate significant warmth for up to several hours, for some hand warmers up to 57 degrees Celsius (135 degrees Fahrenheit).

Yet another alternative heat-generating reaction is the reaction of copper sulfate with powdered zinc, with an enthalpy of reaction of approximately −200 kJ/mol.

Where heat-generating element 222 relies upon an exothermic chemical reaction to increase the temperature of uncured composite workpiece 205, the heat-generating element 222 can be placed proximate to uncured composite workpiece 205 as individual heat-generating packages or packets 242, where packets 242 include the necessary reactants for the desired chemical reaction. Each packet 242 is configured so that the desired exothermic reaction can be activated by mixing or combining two or more of the components retained by the packet. Packets 242 can be arranged to be proximal, or adjacent to, uncured composite workpiece 205. In particular, where workpiece 205 is disposed within interior volume 240 of container 220, packets 242 can simply be added to container 220, or packets 242 can be disposed around uncured composite workpiece 205 as to substantially surround the workpiece, as shown in FIG. 11.

As an alternative, or in addition, heat-generating element 222 can rely upon an exothermic chemical reaction where one of the reactants is added to the heat-generating element, rather than being included within heat-generating element 222. For example, the selected chemical reaction can require a reactant such as oxygen or water, to produce heat. Where such a heat-generating element is provided as a packet 242, the packet can be opened or unsealed, such as by perforation or by peeling back a portion of the packaging, and then the packet can be disposed adjacent uncured composite workpiece 205.

Figure 12:
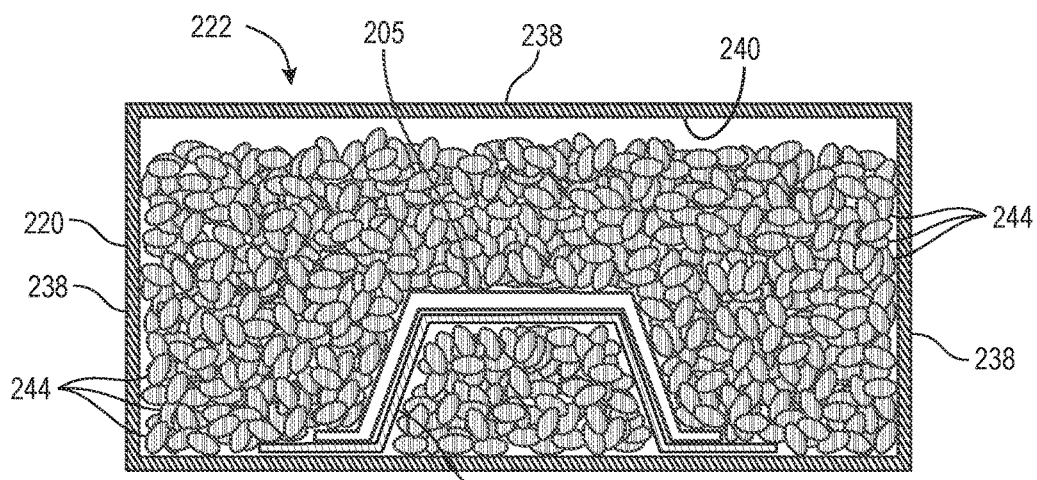
FIG. 12 is a cross-sectional view of an illustrative uncured composite workpiece disposed upon a rigid form within an illustrative container with a plurality of heat-generating pellets.

Alternatively, heat-generating element 222 is added to container 220 in the form of pellets 244, as depicted in FIG. 12. The requisite reactant can then be added to either the unsealed packets or pellets while they are in container 220. For example, after disposing heat-generating element proximate to uncured composite workpiece 205 and rigid form 204 within container 220, a reagent solution containing the additional requisite component for the reaction can be added to container 220, either before the container is sealed, or via a vent or plumbed inlet in the sealed container.

For example, heat-generating element 222 can be selected to undergo an exothermic reaction with water, and so heating is initiated by adding water to heat-generating element 222 within container 220. In yet another example, where heat-generating element 222 is selected to react with oxygen, container 220 can incorporate sufficient ventilation that oxygen reaches the heat-generating element while container 220 is closed, without compromising the integrity of container 220, for example where container 220 is a constraining container configured to contain pressures applied to the uncured composite workpiece.

2. Exothermic Change of Phase

As an alternative, the disclosed systems and methods may employ a heat-generating element 222 that relies upon an exothermic change of state to heat the uncured composite workpiece. For example, some solids undergoing dissolution in a solvent can release a significant amount of heat. Conversely, crystallization of a selected solid from a saturated solution can also release useful heat energy.

The dissolution of anhydrous calcium chloride, for example, is an exothermic process that has been used in portable heating pads. Typically, an amount of anhydrous calcium chloride and a supply of water are contained in separate compartments, and the heating pad is activated by mixing the contents of the separate compartments, for example by squeezing the heating pad to rupture a membrane disposed between the compartments.

Similar to the illustrative calcium oxide-water based heating packet above, an illustrative heat-generating packet utilizing the dissolution of calcium chloride to generate heat might include 55.5 grams of dry calcium chloride (0.5 mol), separated from 200 mL of water in a separate chamber. The enthalpy of dissolution for calcium chloride is −82.8 kJ/mol, and the molecular weight of calcium chloride is 110.98 g/mol. When allowed to combine, for example by piercing a membrane between the two chambers, the calcium chloride will dissolve in the water, and the dissolution will generate 41.4 kJ of heat energy. Assuming ideal conditions where all of that energy is used to heat the 200 mL of water, and that the water is initially at 20 degrees Celsius, and the water will reach a temperature of 70 degrees Celsius (158 degrees Fahrenheit).

A common alternative heating system includes a packet containing a supersaturated aqueous solution of sodium acetate. Crystallization of sodium acetate trihydrate can be initiated by flexing a small disc of notched ferrous metal within the solution, which creates a nucleation site for the sodium acetate. Crystallization then occurs very rapidly, and generates significant amounts of heat.

The sodium acetate crystallization system offers an additional advantage that it is completely reusable, as placing the packet containing the sodium acetate crystals in boiling water redissolves the sodium acetate in the water contained in the package. Permitting the packet to cool to room temperature recreates a supersaturated solution, and the packet can be used for heating again.

Where heat-generating element 222 is selected to rely upon a change in phase to generate heat, heat-generating element 222 can be added as an individual packet or packages of the phase-changing component, which can be activated by mixing or combining two or more components of the packet, or otherwise triggering a change in phase. The packets can be arranged to be adjacent to the uncured composite workpiece 205, or dispersed throughout interior volume 240 of container 220, as shown for packets 242 in FIG. 11.

E. Heating Mediation Agent

The heating characteristics of heat-generating element 222 can be altered by the addition of one or more heating mediation agents 246. Heating mediation agents 246 include those materials or combinations of materials that may be utilized in conjunction with heat-generating element 222 in order to modify the heating characteristics of heat-generating element 222. Heating mediation agents may be selected to, for example, increase the heating ability of heat-generating element 222, decrease the heating ability of heat-generating element 222, change the rate of heating by heat-generating element 222, or render the heating by heat-generating element 222 more uniform. That is, by selecting one or more appropriate heating mediation agents 246, and their relative amounts, the process of heating the uncured composite workpiece can be customized to obtain a different and more desirable heating curve, modifying one or more of the rate of heating, the duration of heating, and the resulting temperature range, among others.

Heating mediation agents may be single-component or multiple-component, and can be added to container 220 as packets or packages containing the one or more components of the heating mediation agent. Alternatively, or in addition, one or multiple components of the heating mediation agent can be pelletized. Where the heating mediation agent is pelletized, it is compressed, cast, molded, or otherwise shaped into one or more pellets.

Figure 13:
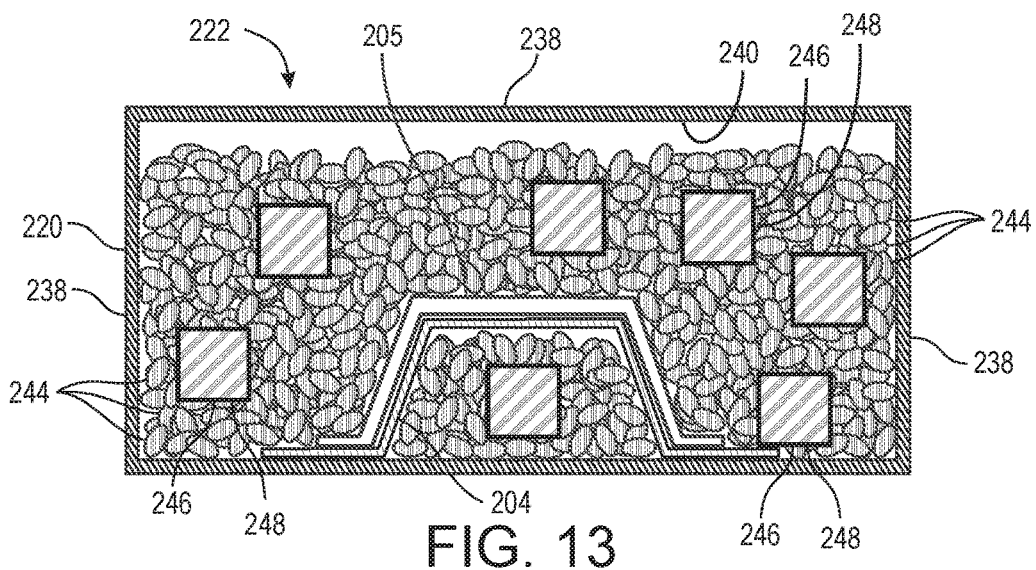
FIG. 13 is a cross-sectional view of an illustrative uncured composite workpiece disposed upon a rigid form within an illustrative container with a plurality of heat-generating pellets and a heating mediation agent.

Adding heating mediation agent 246 to container 220 can include the addition of an amount of a heat-absorbing substance 248. Heat-absorbing substance 248 may be selected to have a relatively high heat capacity. That is, the substance may be capable of absorbing a relatively large amount of heat while only slowly or only slightly increasing in temperature. Any substance with a relatively high heat capacity may be useful as a heat-absorbing substance. Water, in particular, has both an unusually high heat capacity (4.18 J/g° C.), but is both inexpensive and safe. Heating mediation agent 246 can therefore include one or more packages of water dispersed among the heat-generating element 222, as shown in FIG. 13.

Figure 14:
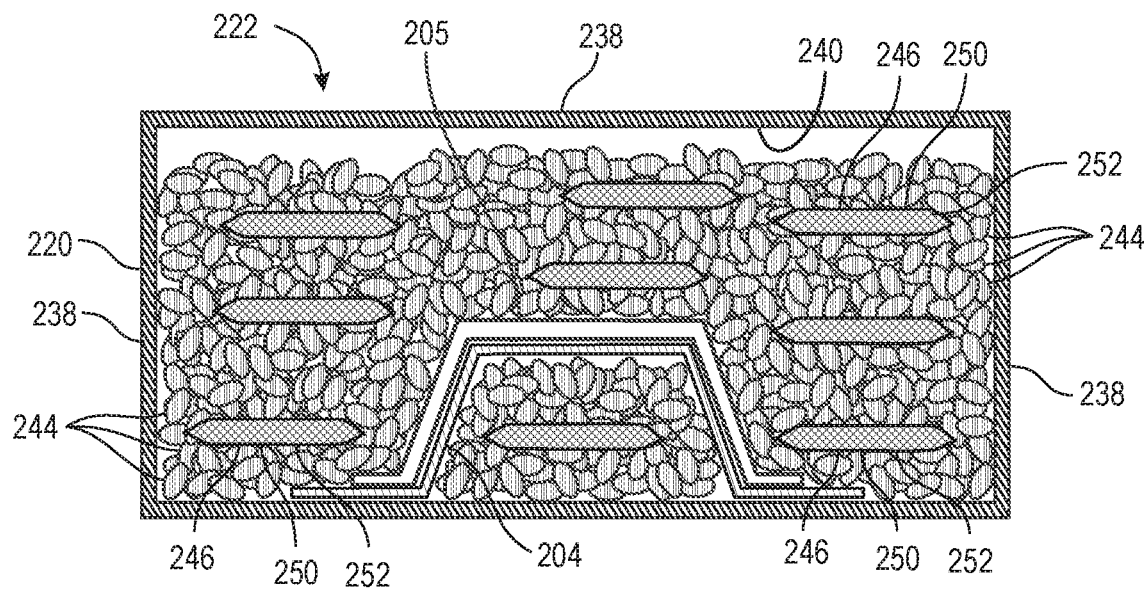
FIG. 14 is a cross-sectional view of an illustrative uncured composite workpiece disposed upon a rigid form within an illustrative container with a plurality of heat-generating pellets and a heating mediation agent that is a cooling element.

Alternatively, or in addition, heating mediation agent 246 can be selected to be a cooling element 250, where cooling element 250 is selected to be capable of undergoing an endothermic chemical reaction when activated, or capable of undergoing an endothermic physical reaction when triggered. Unlike the exothermic properties of heat-generating element 222, endothermic systems are chemical reactions of physical changes of state that absorb heat from the immediate environment. By selecting an appropriate cooling element 250, and an appropriate relative amount of the element, the heating capacity of heat-generating element 222 can be modified. For example, the amount of heating can be decreased (lowering the final temperature), and/or the rate of heating can be decreased. Heating mediation agent 246 can therefore include one or more cooling elements 250 dispersed among the heat-generating element 222, as shown in FIG. 14.

1. Endothermic Chemical Reaction

Where cooling element 250 is selected to be capable of absorbing heat via an endothermic chemical reaction, the cooling element typically includes the reactants required for the desired chemical reaction to occur. The chemical reaction itself should be energetically favorable, even if it absorbs heat as the reaction proceeds, and so one or more of the requisite reactants can therefore be isolated from the others, in order to prevent the reaction from proceeding until cooling is desirable. The desired chemical reaction is typically substantially self-sustaining, so that once the cooling reaction is initiated, either by adding or intermixing the necessary reactants, the reaction will proceed until sufficient cooling is achieved, and/or until the reaction is substantially complete.

A number of endothermic chemical reactions exist. However, for the purposes of the present systems and methods, an appropriate endothermic chemical reaction would one that employs reactants that are relatively inexpensive, and relatively non-hazardous, such as the following exemplary reactions.

The reaction of solid barium hydroxide octahydrate with dry ammonium chloride is an example of a solid-state reaction. That is, the reaction occurs between two solid reactants, with the generation of water and ammonia gas.

$$Ba(OH)_2 \cdot 8H_2O(s) + 2NH_4Cl(s) \rightarrow 2NH_3(g) + 10H_2O(l) + BaCl_2(s) \Delta H = 63.5 \text{ kJ/mol}$$

The reaction is quite endothermic, with a heat of enthalpy of $\Delta H^+ = 63.5$ kJ (note that the enthalpy in this case is a positive number, indicating that heat energy is absorbed during the reaction. Precautions should be taken with this cooling system, such as providing adequate venting, as the evolved ammonia can be an irritant.

Another endothermic reaction suitable for use as cooling element 250 is the reaction of acetic acid (or vinegar) with sodium carbonate. The initial reaction of sodium carbonate and acetic acid produces sodium acetate and carbonic acid, however carbonic acid is unstable in water and decomposes to water and carbon dioxide. It is the overall reaction that is endothermic.

$$NaHCO_3 + HC_2H_3O_2 \rightarrow NaC_2H_3O_2 + H_2O + CO_2$$

For this cooling element, both the reactants and products are substantially safe.

Where cooling element 250 relies upon an endothermic chemical reaction to decrease the overall temperature of the curing system, the cooling element 250 can be placed proximate to heat-generating element 222 as individual packets or packages 252 of the necessary reactants, which can be activated by mixing or combining two or more components of the packet. Alternatively, the packets can simply be added to container 220.

As with the analogous heat-generating elements, the cooling element packets can be opened or unsealed, such as by perforation or by peeling back a portion of the packaging, and then the packet can be disposed within container 220. Any requisite reactants or components can then be added to the unsealed packets, for example where heat-generating element 222 is disposed within container 220, such as the addition of a solution.

2. Endothermic Change of Phase

As an alternative, the disclosed systems and methods may employ a cooling element 250 that relies upon an endothermic change of state to mediate heating of heat-generating element 222.

The addition of sodium chloride to water ice, as is often used to make ice cream, results in the freezing point depression of liquid water, resulting in the melting of the ice and a salt solution that is at a temperature lower than the freezing point of pure water.

The sublimation of solid carbon dioxide (dry ice) can also be an effective cooling element, and leaves no residue, although good ventilation may be helpful when large amounts of carbon dioxide may be evolved.

$$CO_2(s) \rightarrow CO_2(g) \Delta H = 25.2 \text{ kJ/mol}$$

The dissolution of some salts in water is endothermic, as the energetic cost of breaking up their ionic lattice is higher than the energy obtained by solvation. For this reason, both ammonium chloride and ammonium nitrate have been used commercially in instant ice packs.

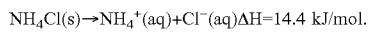

Where the cooling element relies upon a change in phase to generate heat, the cooling element can be added as an individual packet or packages 252 of the phase-changing component, which can typically be activated by mixing or combining two or more components of the packet, such as adding a solvent, or otherwise triggering the necessary change in phase. When present, the packets can be arranged to be dispersed or intermixed with the heat-generating element 222 being utilized to heat uncured composite workpiece 205.

F. Application of Pressure

The various manufacturing processes for manufacturing a composite workpiece as described herein employ heating uncured composite workpiece 205 with heat-generating element 222 to cure the engineered composite workpiece. As is well-known in composite manufacturing, it can at some times be desirable to additionally apply pressure to the uncured composite workpiece to aid in consolidation of the composite material, and to ensure that the matrix material has fully saturated and enclosed the reinforcing materials embedded in the matrix.

Uncured composite workpiece 205 can be consolidated by any method of applying pressure that is routinely and typically employed in composite manufacture, including but not limited to employing a press to apply pressure to the uncured workpiece. Pressure can be applied to uncured composite workpiece 205 as it rests upon rigid form 214 to form workpiece assembly 212. Alternatively, both the press and rigid form 214 can be shaped so as to create the desired conformation for the composite workpiece, such as where the press and rigid form 214 include two halves of an appropriate mold.

Figure 15:
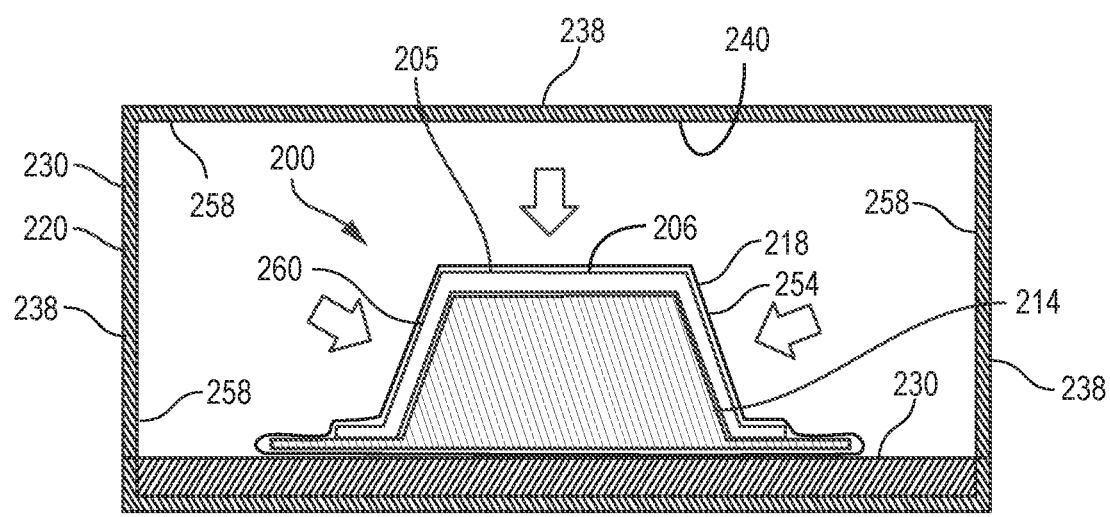
FIG. 15 is a cross-sectional view of an illustrative uncured composite workpiece disposed on a rigid form within an illustrative constraining container.

Alternatively, or in addition, although barrier film 218 can be a single ply of a barrier material applied to upper surface 206 of uncured composite workpiece 205, barrier film 218 can alternatively be a portion of a larger vacuum bag 254 that encloses the entire uncured composite workpiece 205, and optionally encloses the entire workpiece assembly 200, where bag 254 can be evacuated, as shown in FIG. 15. When a vacuum is applied to vacuum bag 254 during heating, the differential pressure applied to uncured composite workpiece can help consolidate the composite workpiece during curing. Additionally, the use of vacuum bag 254 to enclose the uncured composite workpiece can help reduce potential porosity defects in the resulting composite part.

Where it is desirable to manufacture composite materials in an out-of-autoclave setting, pressure can be applied to the uncured composite workpiece by employing a constraining container 230 that encloses uncured composite workpiece 205, heat-generating element 222, and an expandable element 232, as discussed below.

1. Expandable Element

Where an expandable element 232 is employed in curing uncured composite workpiece 205, container 220 may be a constraining container 230 that is configured so as to be capable of being sealed, and to withstand internal pressure against inner surfaces 258 of container walls 238. FIG. 15 schematically depicts workpiece assembly 212 of FIG. 9, including uncured composite workpiece 205 disposed upon a solid rigid form 214. Assembly 212 is disposed within an exemplary constraining container 230, where container 230 is constructed so as to facilitate the application of pressure upon uncured composite workpiece 205 by the expansion of an expandable element 232. Constraining container 230 is configured to enclose workpiece assembly 212, so that container walls 238 define an interior volume 240 within constraining container 230 and intermediate inner surfaces 258 of container walls 238 and the outer surface 260 of uncured composite workpiece 205. The addition of expandable element 232 to container volume 240, in an amount sufficient to make contact with both uncured composite workpiece 205 and inner surfaces 258 permits the generation and application of pressure upon surface 260 of workpiece 205 when expandable element 232 is expanded.

Constraining container 230 is typically constructed so that the addition of workpiece assembly 212 and subsequent addition of expandable element 232 is facilitated, as well as removal of the expanded element and workpiece after curing is completed. Constraining container 230 can incorporate a removable upper surface, or lid, or feature one or more removable panels to provide access to the interior of the container. Any type of sealable opening is an appropriate opening, provided that when it is sealed, the container can withstand the pressure generated within the container.

In one aspect, constraining container 230 can be prepared using a variety of a cement, a plaster, or a concrete. The creation of inexpensive molded containers using cement, plaster, or concrete can help reduce the cost of composite manufacture, as the materials used for such containers can be inexpensive, and would not require sophisticated tooling to prepare. Alternatively, constraining container 230 can include multiple parts, such as a base, walls, and cover, and the multiple parts of constraining container 230 are assembled and/or clamped together to form constraining container 230.

Alternatively, constraining container 230 can be comprised of multiple parts, such that when disassembled, enhanced access is provided to rigid form 214, for example to assist in the layup of uncured composite workpiece 205. Upon assembly of workpiece 205, constraining container 230 can be partially or fully assembled. In one aspect, constraining container 230 is partially assembled, and only fully assembled after the addition of heat-generating element 222 and expandable element 232. Alternatively, or in addition, constraining container 230 can be configured so that it can be conveniently used to effect repair of composite materials in the field.

In order for appropriate compressive forces to be applied to uncured composite workpiece 205 while it is being heated within constraining container 230, rigid form 214 can be well-supported either by a substantially non-compressible surface, or alternatively, by another source of compressive force to be applied against the underside of rigid form 214. It can be sufficient for rigid form 214 to be supported by the lower wall of constraining container 230, or rigid form 214 can be supported by a substantially noncompressible floor 262. Alternatively, assembly 212 of workpiece 205 and rigid form 214 can be disposed on a layer of expandable element 232, so as to effectively apply pressure from expanding expandable element 232 on all sides of uncured composite workpiece 205 and rigid form 214. In yet another aspect, rigid form 214 can be incorporated into the structure of constraining container 230 itself. That is, rigid form 214 can be a portion of, or an extension of, a lower surface of constraining container 230, for example.

Constraining container 230, or one of its component parts, can be configured to vibrate during the process of curing the uncured composite workpiece 205, so as to help settle the contents of constraining container 230 and to apply pressure to workpiece 205 more uniformly.

Expandable element 232 can take any form that is compatible with heat-generating element 222. Expandable element 232 can be added to constraining container 230, for example, as a powder or a foam. Alternatively, or in addition, expandable element 232 can be added to constraining container 230 as discrete portions of a solid or semi-solid, such as layers of an expandable element 232 which can be draped across assembly 212, or as smaller portions such as pellets, or beads. Where expandable element 232 is used in the form of smaller solid or semi-solid portions, expandable element 232 can be added to container 220 by adding individual sacks or bags of pellets, beads, or other smaller portions. FIGS. 12-14 and 16-25 depict expandable element 232 as a plurality of thermally-expandable pellets 264, however this is a representative depiction and should not be considered in any way limiting.

Typically, expandable element 232 is added to an interior volume 240 of constraining container 230 while expandable element 232 is in an unexpanded state, as shown in FIG. 12. Prior to and/or during the heating and curing process, expandable element 232 is made to expand (e.g., to increase in volume) to at least partially fill interior volume 240, such that the expanded expandable element applies positive pressure directly or indirectly to at least some inner surfaces 258 of constraining container 230 as well as the upper and outer surface of uncured workpiece 205. The pressure exerted by expandable element 232 as it expands thereby helps to compress and consolidate workpiece 205 as it is heated by heat-generating element 222.

Typically, expandable element 256 is configured to expand (e.g., to a predetermined volume and/or pressure) when a predetermined change is produced in an attribute of the unexpanded element. Expandable element 232 can be inserted into container interior volume 240 in an unexpanded state, and the predetermined change is subsequently produced in the attribute of the unexpanded element while the unexpanded element is within interior volume 240, and the unexpanded element expands in response to the produced predetermined change. The attribute of expandable element 232 can be a physical and/or chemical attribute.

The expandable element 232 can be configured to expand in volume when it interacts with water. For example, where the expandable element 232 is or includes a desiccant, the desiccant can increase in volume as water is absorbed. For example, anhydrous calcium sulfate (anhydrite) can exhibit an increase in volume of 61% when it absorbs water to form gypsum.

Water can be added to expandable element 232 directly, such as by adding liquid water or water vapor to the interior of constraining container 230. Alternatively, or in addition, water or water vapor can be generated within container 220 itself, for example by an appropriate chemical reaction.

More typically, expandable element 232 is a thermally-expandable element 256, and the predetermined change in an attribute of the unexpanded element includes a change in the temperature of thermally-expandable element 256 and/or the temperature of one or more portions of the expandable element. Accordingly, producing the predetermined change in the attribute of thermally-expandable element 256 can include raising the temperature of the unexpanded expandable element from a lower temperature, such as an ambient temperature (e.g., room temperature), to at least a predetermined temperature greater than the initial or ambient temperature (e.g., the predetermined temperature is a number of degrees above the ambient temperature suitable to produce a predetermined expansion of the expandable element). Thermally-expandable element 256 can then undergoes thermal expansion as a result of the increase in temperature.

As discussed, heating of the uncured composite process is effected by heat-generating element 222. Where the predetermined temperature of thermally expandable element 256 is selected to be lower than the expected temperature generated by heat-generating element 222, then the heat-generating element 222 can be sufficient to heat both the uncured composite workpiece 205 and thermally-expandable element 256, causing expandable element 256 to expand and exert pressure upon uncured composite workpiece 205.

Typically, heating the thermally-activated expandable element 256 to at least a predetermined temperature can include producing a predetermined pressure against the uncured composite workpiece when the thermally-activated expandable element 256 is heated to at least the predetermined temperature. Typically, the predetermined pressure is a pressure sufficient to adequately cure the composite material.

The predetermined change produced in the attribute of the unexpanded element can be a combination of two or more properties of expandable element 256, such as a ratio or a product of quantitative values associated with properties of the expandable element, such as two materials that have different coefficients of thermal expansion.

The process of heating workpiece 205 can produce the predetermined change in temperature of thermally-expandable element 256. Therefore, the expansion of thermally-expandable element 256 can occur automatically during the heating process. For example, the attribute can be a temperature of thermally-expandable element 256, and heat applied to assembly 212 by heat-generating element 222 can produce the predetermined change in the temperature of thermally-expandable element 256. One or more properties of thermally-expandable element 256 can be designed such that the temperature change induced in thermally-expandable element 256 during the heating of workpiece 205 causes thermally-expandable element 256 to expand a desired predetermined amount as a result of thermal expansion. Alternatively, or additionally, causing thermally-expandable element 256 to expand can require additional steps beyond those required to cure workpiece 205. For example, causing thermally-expandable element 256 to expand can include applying an electric field, injecting a liquid, gas, and/or another suitable material, and/or inducing any other suitable change in expandable element 256.

Where expandable element 256 is a thermally-expandable element, the thermally-expandable element is optionally pelletized, having been compressed, cast, molded, or otherwise shaped into one or more thermally-expandable pellets 264. In one aspect, thermally-expandable pellets 264 can include foamable pellets configured to foam when heated to at least a predetermined foaming temperature. Expandable pellets 264 can include a foamable material, e.g., a thermoplastic material treated with a blowing agent; a gas-filled balloon; hollow microspheres, a metal; any other suitable component configured to expand when heated, or any combination thereof.

Thermally-expandable pellets 264 can comprise any material capable of undergoing expansion when the predetermined foaming temperature is reached. In particular, thermally-expandable pellets 264 can include thermoplastic materials, typically plastic polymers capable of softening when heated. When heated above its glass transition temperature and below its melting point, a solid thermoplastic material softens, becoming a viscous liquid. In this state, thermoplastics can be reshaped, and more specifically, can be expanded.

A variety of classes of thermoplastic materials are known, including acrylic polymers, acrylonitrile butadiene styrene (ABS) polymers, nylon polymers, polylactic acid (PLA) polymers, polybenzimidazole polymers, polycarbonate polymers, polyether sulfone (PES) polymers, polyetherimide (PEI) polymers, polyethylene (PE) polymers, polyphenylene oxide (PPO) polymers, polyphenylene sulfide (PPS) polymers, polyvinyl chloride (PVC) polymers, polyvinylidene fluoride (PVDF) polymers, and polytetrafluoroethylene (PTFE) polymers, among others. In particular, thermally-expandable pellets 264 that include acrylonitrile butadiene styrene (ABS) polymers can exhibit favorable physical properties when used in conjunction with the systems described herein.

Thermally-expandable pellets 264 can additionally include a blowing agent. Typically, a blowing agent is selected so that, when heated to at least a predetermined temperature, it forms a plurality of holes, pockets, or voids within the material of expandable element 256, such that the volume of the pellet increases. For example, an appropriate blowing agent can be an inert gas that is permeated into expandable element 256 under pressure. Such a blowing agent can be configured to expand in a plurality of locations within thermally-expandable pellets 264 when the temperature of the pellet is increased from an ambient or initial temperature to a predetermined higher temperature, and the expanded gas forms holes, pockets, or voids within the pellet. A blowing agent, if present, can be applied to expandable element 256 prior to heating.

The blowing agent can be, for example, a gas or liquid, such as carbon dioxide, nitrogen, one or more hydrocarbons, water, and/or any other suitable physical and/or chemical blowing agent. The blowing agent can be introduced to thermally-expandable pellets 264 under pressure when the blowing agent is a gas, so that the gas diffuses into the pellet to render it foamable. Alternatively, or additionally, the blowing agent can comprise one or more expandable gas-filled microspheres that are embedded in the pellet when it is initially formed. Suitable microspheres can include expandable thermoplastic microspheres sold by AkzoNobel, Inc. of Chicago, Ill. under the proprietary name EXPANCEL.

Where thermally-expandable pellets 264 include a blowing agent, the blowing agent can be any appropriate substance capable of producing the desired degree of expansion of the resulting pellets. The blowing agent may include a physical blowing agent such as a chlorofluorocarbon, a hydrochlorofluorocarbon, a hydrocarbon, or liquid $CO_2$, among others. Alternatively or in addition, the blowing agent may include a chemical blowing agent selected to react with one or more components of the expandable pellets, such as isocyanate and water for polyurethane, azodicarbonamide for vinyl, hydrazine and other nitrogen-based materials for thermoplastic and elastomeric foams, and sodium bicarbonate for thermoplastic foams, among others.

Where the expandable pellets include a blowing agent, the blowing agent can include a foaming agent. Whereas the blowing agent can be selected to form a gas, the foaming agent can be a material that facilitates formation of a foam, such as for example, a surfactant. Suitable foaming agents can include sodium laureth sulfate, sodium lauryl ether sulfate (SLES), sodium lauryl sulfate (also known as sodium dodecyl sulfate or SDS), and ammonium lauryl sulfate (ALS), among others.

A suitable number of thermally-expandable pellets 264 of thermally-expandable element 256 to be placed within interior volume 240 of constraining container 230 can include any number of pellets, provided that when heated, they expand to apply a positive pressure to the surface of uncured workpiece 205 sufficient to consolidate and shape the desired workpiece during curing, and that number is dependent upon the size of interior volume 240. That is, where the constraining container 230 fits more closely around the contours of assembly 212, fewer thermally-expandable pellets 264 may be needed.

The number of thermally-expandable pellets 264 needed within interior volume 240 can, for example, be between 10 and 100 pellets, or between 100 and 500 pellets, or between 500 and 1000 pellets, or greater than 1000 pellets, depending on the application and workpiece assembly. Typically, a length of each expandable pellet 264 is less than one centimeter. Expandable pellets 264 can be substantially uniform in size, or can include pellets of different sizes.

Figure 16:
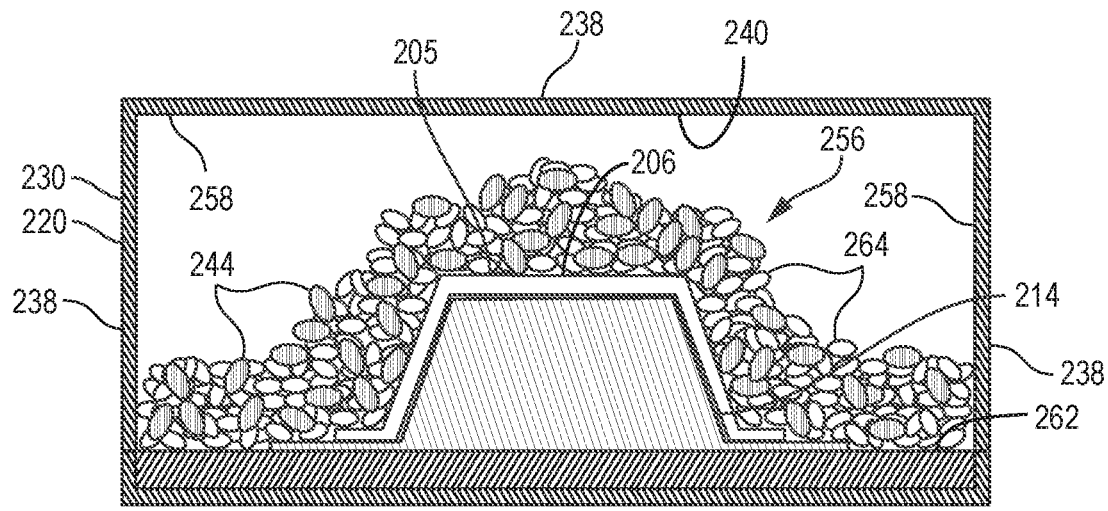
FIG. 16 is a cross-sectional view of an illustrative uncured composite workpiece disposed within an illustrative constraining container with a mixture of heat-generating pellets and thermally expandable pellets.
Figure 17:
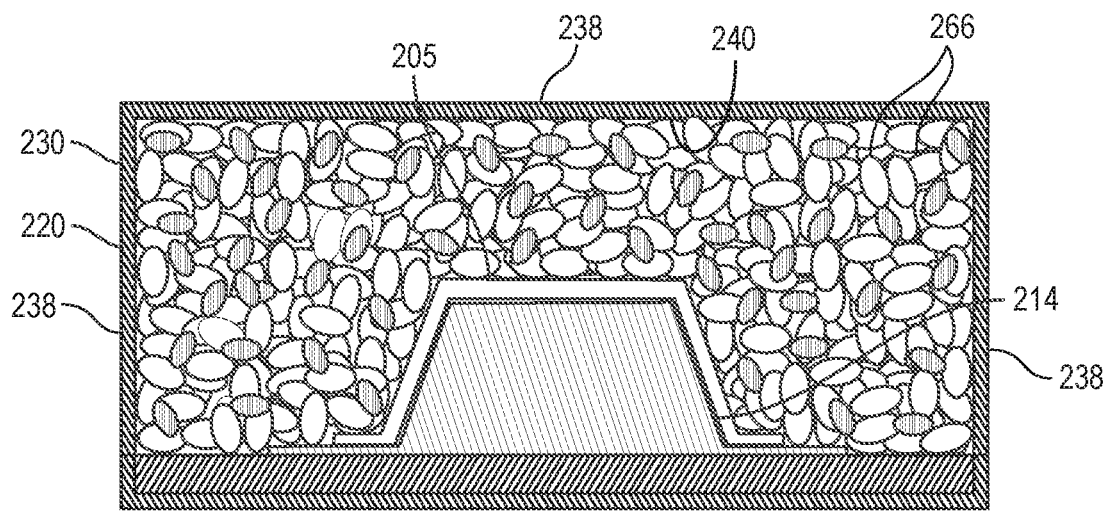
FIG. 17 is the illustrative constraining container of FIG. 16 after expansion of the thermally expandable pellets.

During the process of heating uncured workpiece 205 with heat-generating element 222, by heating thermally-expandable pellets 264 to the predetermined first temperature at which thermally-expandable pellets 264 will expand, pellets 264 can be made to expand from an unexpanded state to an expanded state. Thermally-expandable pellets 264 can expand to at least partially fill interior volume 240, such that the expanded expandable pellets in combination with heat-generating element 222 apply positive pressure to uncured workpiece 205 as it is disposed upon rigid form 214 and the workpiece is cured. FIG. 16 depicts a combination of heat-generating pellets 244 and thermally-expandable pellets 264 within interior volume 240 prior to heating and expansion, while FIG. 17 depicts activated heat-generating pellets 244 and expanded pellets 266 within interior volume 240 after thermally-expandable pellets 264 have expanded into expanded pellets 266.

Thermally-expandable pellets 264 can be formulated so that they are at least partially deformable after, during, and/or before expansion. A degree of deformability allows thermally-expandable pellets 264 to squeeze into small gaps among and between heat-generating elements 222, between heat-generating elements 222 and container inner surfaces 258, and/or between heat-generating elements 222 and upper surface 206 of uncured workpiece 205. Filling these gaps allows thermally-expandable pellets 264 to present a substantially smooth surface to workpiece 205.

After workpiece 205 has been cured, constraining container 230 can be unsealed and/or opened as needed, and partially or fully expanded pellets 264 can be removed from interior volume 240. Although expanded pellets 266 are typically readily removed from constraining container 230 after workpiece 205 has been cured, in some examples expanded pellets 266 can remain expanded and tightly packed together after workpiece 205 has been cured and cooled, which may tend to impede their removal from constraining container 230. Thermally-expandable pellets 264 can therefore be additionally configured in one or more ways to be more easily separated from workpiece 205, rigid form 214, heat-generating element 222, and/or inner surfaces 258 of constraining container 230.

For example, thermally-expandable pellets 264 can be configured so that the shape and/or size of the corresponding expanded pellets 266 can be changed when desired, so that they can be more readily extracted. For example, thermally-expandable pellets 264 can be configured to shrink when cooled, so that after workpiece 205 is cured and cooled, the pellets shrink in volume, thereby facilitating their removal from the container.

Some formulations for thermally-expandable pellets 264 can exhibit sintering during heating and expansion. That is, thermally-expandable pellets 264 may compact, adhere, and form aggregates or a solid mass during heating and expansion. For some exemplary thermally-expandable pellets 264, sintering during use can be acceptable and may not effect the process of manufacturing a desired composite part.

Alternatively, or in addition, thermally-expandable pellets 264 can be modified so as to minimize sintering (self-adhesion) upon heating and expansion. Alternatively, or in addition, expandable element 256 can be configured to minimize potential adhesion with the surfaces of the container and workpiece assembly, such as by coating pellets 264 with a suitable agent configured prevent adhesion of pellets to one another, and/or to facilitate separation of expanded pellets 266 from each other and/or from container 220 after heating.

In one aspect, a suitable agent for adding to thermally-expandable pellets 264 can include a lubricating agent, such that adding a lubricating agent to the expandable pellets decreases adhesion between pellets before and/or after volumetric expansion of the expandable pellets. A suitable lubricating agent is one that does not interfere with curing of workpiece 205, and prevents expanded pellets 266 from substantially adhering to one another, to the container, or to the components of the workpiece assembly. Suitable lubricating agents can include liquids, powders, or combinations thereof. When added as a powder, a suitable lubricating agent can comprise a nano-powder. Alternatively, or in addition, suitable lubricating agents can include silicon-based materials, fluorinated polymers, or other substantially inert substances. For example, a suitable lubricating agent can include polytetrafluoroethylene (PTFE) powder, PTFE nano-powder, silicone, perfluoropolyether (PFPE), perfluoroalkylether (PFAE), perfluoropolyalkylether (PFPAE), and/or the like. Such a lubricant can be applied to thermally-expandable pellets 264 before the expandable pellets are inserted into constraining container 230. Alternatively, or additionally, a suitable lubricant can be applied to thermally-expandable pellets 264 while they are disposed inside container 220. Coating at least some of thermally-expandable pellets 264 with a suitable lubricant can include mixing the lubricant with the plurality of pellets and/or pouring the lubricant over the plurality of pellets. Additionally, or alternatively, at least a subset of the plurality of thermally-expandable pellets 264 can be coated with a desired lubricant and then mixed in with a plurality of uncoated pellets.

Crystallinity and/or semi-crystallinity along the outer surfaces of thermally-expandable pellets 264 can help to prevent the pellets from sintering to each other. In one aspect, therefore, at least some of thermally-expandable pellets 264 can be configured, such as by preprocessing, to have regions of crystallinity along outer surfaces of the pellets, such that adding thermally-activated expandable element 256 includes adding a plurality of expandable pellets having surface regions of increased crystallinity in order to decrease adhesion between pellets before and/or after volumetric expansion of the expandable pellets.

Thermally-expandable pellets 264 can therefore be employed where outer surfaces of the pellets exhibit a high degree of crystallinity (e.g., a high percentage of the volume of regions of each pellet near the outer surface is crystalline). The crystallinity can be induced in thermally-expandable pellets 264 by controlling one or more factors including the material composition of the pellets, the production temperatures to which the pellets are heated during production, the times for which the pellet temperatures are maintained at the production temperatures during production, electric and/or magnetic fields applied during production, distribution of a blowing agent in the pellets, composition and/or concentration of blowing agent, and so on. The outer surfaces of pellets 264 can be crystalline before foaming, during foaming, and/or after foaming.

Thermally-expandable pellets 264 can be configured to additionally function as heating mediation agents 246. For example, thermally-expandable pellets 264 can be configured so that the foaming process is itself exothermic, such that the foaming process contributes to the heating of the uncured composite workpiece 205 by heat-generating element 222. Alternatively, the expandable pellets can be configured so that the foaming process is endothermic (heat-absorbing). A mixture of exothermic and endothermic foamable pellets may be used in order to fine-tune the temperatures reached within container 220 due to the heating by heat-generating element 222.

2. Volumetric Adjuncts

In conjunction with the use of expanding element 256 to apply pressure to uncured composite workpiece 205, it may be advantageous to add one or more volumetric adjuncts 234 to constraining container 230, in order to enhance the pressure applied to the composite workpiece 205, or to facilitate removal of the contents of constraining container 230 after composite workpiece 205 is cured. Volumetric adjuncts 234 are volumetrically invariant adjuncts, or volumetrically contractible adjuncts, as expandable element 256 already corresponds to a volumetrically expandable adjunct.

As used herein, a volumetrically invariant adjunct is one that does not expand, or expands only minimally (for example less than 3%), when heated by heat-generating element 222 to the predetermined temperature at which expandable element 256 undergoes expansion. The volumetric invariance of a given substance can be quantified with reference to the coefficient of thermal expansion (CTE) of the substance. A substance with a higher CTE can be expected to expand to a greater degree than a substance having a lower CTE. The volumetric invariance of two substances can therefore be directly compared by comparing their respective CTE values.

For example, an adjunct composed of a steel alloys can be expected to undergo only minimal expansion during heating, as steel alloys have CTE values of $6.3\text{-}7.3\times10^{-6}$ inch/inch-F. The use of borosilicate glass can offer an adjunct that undergoes even less expansion, as borosilicate glass has a CTE of $2.2\times10^{-6}$ inch/inch-F. Aluminum metal, on the other hand, can undergo relatively greater expansion, having a CTE of $1.2\text{-}1.3\times10^{-5}$ inch/inch-F.

A volumetrically-invariant adjunct 268 is an adjunct that is selected to maintain substantially the same volume throughout the range of pressures expected to be generated within constraining container 230 during the curing process. In addition to being selected to exhibit no or only minimal expansion during heating, an appropriate volumetrically-invariant adjunct 268 can be selected to be substantially noncompressible under the applied pressures expected to be generated within constraining container 230.

The addition of a one or more volumetrically invariant adjuncts 268 may permit the application of a desired pressure for curing workpiece 205 while using fewer thermally-expandable pellets 264, because as pellets 264 expand, volumetrically invariant adjuncts 268 will typically transfer any unbalanced pressures from one side of the adjunct to the other, with virtually no loss of pressure. In this way, fewer thermally-expandable pellets 264 can be sufficient to cure a desired workpiece. Additionally, volumetrically-invariant adjunct 268 can be reusable, representing a further increased saving in materials used during the curing process.

Typically, each volumetrically-invariant adjunct 268 can have a volume that is approximately the same size as a single expandable pellet 256. Alternatively each volumetrically-invariant adjunct 268 can have a volume larger than a single thermally-expandable pellet 264. Volumetrically invariant adjunct 268 can have a volume between five times and ten times larger than a volume of one thermally-expandable pellet 264, or a volume between ten times and twenty times larger than a volume of one thermally-expandable pellet 264, or a volume more than twenty times larger than a volume of one thermally-expandable pellet 264.

Volumetrically-invariant adjuncts 268 can include any material that is insensitive to the conditions likely to occur within constraining container 230. For example, volumetrically-invariant adjuncts 268 can include a glass, a ceramic, or a metal, or a combination thereof. Volumetrically-invariant adjunct(s) 268 can be spherical, cylindrical, or any other shape suitable for addition to and removal from constraining container 230. In one aspect volumetrically invariant adjuncts 268 can include solid beads, spheres, or rods. In another aspect, volumetrically invariant adjuncts 268 can include hollow beads, spheres, or rods.

In one aspect, the curing process includes inserting a plurality of volumetrically invariant adjuncts 268 into interior volume 240 of the constraining container 230 with expandable element 256 and heat-generating element 222, where the plurality of volumetrically invariant adjuncts 268 include bead- or rod-shaped invariant adjuncts.

Figure 18:
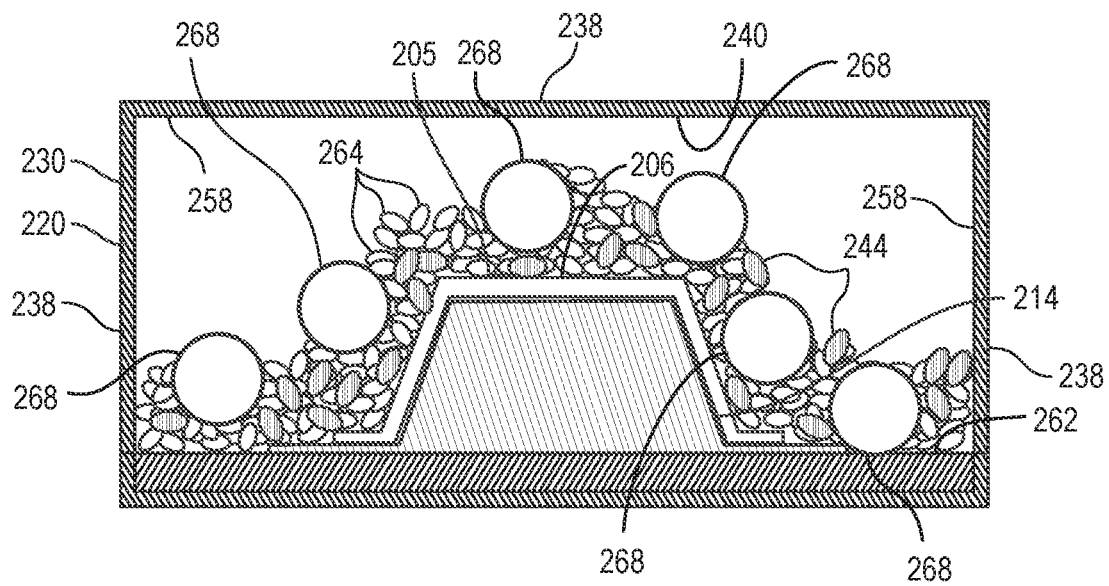
FIG. 18 is a cross-sectional view of an illustrative uncured composite workpiece disposed on a rigid form within an illustrative constraining container with a mixture of heat-generating pellets, thermally expandable pellets, and volumetrically-invariant adjuncts.

As shown schematically in FIG. 18, prior to curing workpiece assembly 200, volumetrically invariant adjuncts 268, unexpanded thermally-expandable pellets 264, and heat-generating pellets 244 can be inserted into interior volume 240 of constraining container 230. The position of volumetrically invariant adjuncts 268 within interior volume 240 can be selected so that some thermally-expandable pellets 264 are disposed between any volumetrically invariant adjunct and upper surface 206 of workpiece 205 during curing, as if a substantially noncompressible volumetrically invariant adjunct were instead pushed against portions of uncured composite workpiece 205 during curing, volumetrically invariant adjunct 268 might undesirably deform workpiece 205. Volumetrically invariant adjuncts 268 can provide additional surfaces for thermally-expandable pellets 264 to push against as they expand, which can benefit the distribution of pressure throughout interior volume 240 (e.g., by making the pressure distribution more uniform throughout the volume, and/or within selected portions of the volume).

Figure 19:
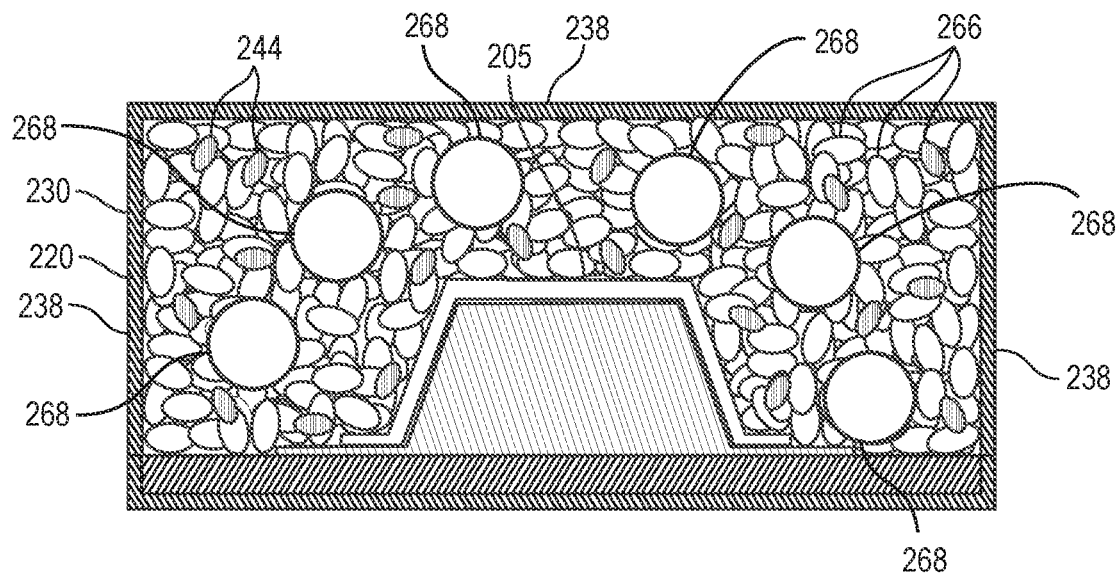
FIG. 19 is the illustrative constraining container of FIG. 18 after expansion of the thermally expandable pellets.

FIG. 19 schematically depicts the constraining container of FIG. 18 after curing and prior to removal of expanded pellets 266 and the cured composite workpiece. Expanded pellets 266 have expanded to push against volumetrically invariant adjuncts 268, inner surfaces 258 of constraining container 230, and the outer/upper surfaces of workpiece 205. During and/or prior to curing of workpiece 205, the presence of volumetrically invariant adjuncts 268 can help push thermally-expandable pellets 264 into edge portions, corners, crevices, pockets, and/or narrow portions of interior volume 240.

Alternatively, or in combination, the addition of a volumetric adjunct 234 that is a contractible element 270 to the interior of constraining container 230 along with thermally-expandable pellets 264 can provide additional and advantageous results. In this aspect, the curing process can include inserting a contractible element into the interior volume 240 of constraining container 230 with expandable element 256, where contractible element 270 can be configured to volumetrically contract when a predetermined change is produced in an attribute of the contractible element. Although depicted schematically as spheres or cylinders in FIGS. 20-22, a suitable contractible element 270 may have any shape, size or geometry that facilitates the manipulation of contractible element 270 (i.e., handling, shipping, and adding the contractible element to constraining container 230).

Typically, contractible element 270 can be configured to shrink when cooled from a heated curing temperature (e.g., a temperature achieved during heating by heat-generating element 222) to an ambient temperature, or a temperature otherwise lower compared to curing temperatures. Contractible element 270 can be larger in volume than a single one of thermally-expandable pellets 264. For example, contractible element 270 can have a volume between five times and ten times larger than a volume of one of thermally-expandable pellets 264, or a volume between ten times and twenty times larger than a volume of one of the pellets, or a volume more than twenty times larger than a volume of one of the pellets.

Figure 20:
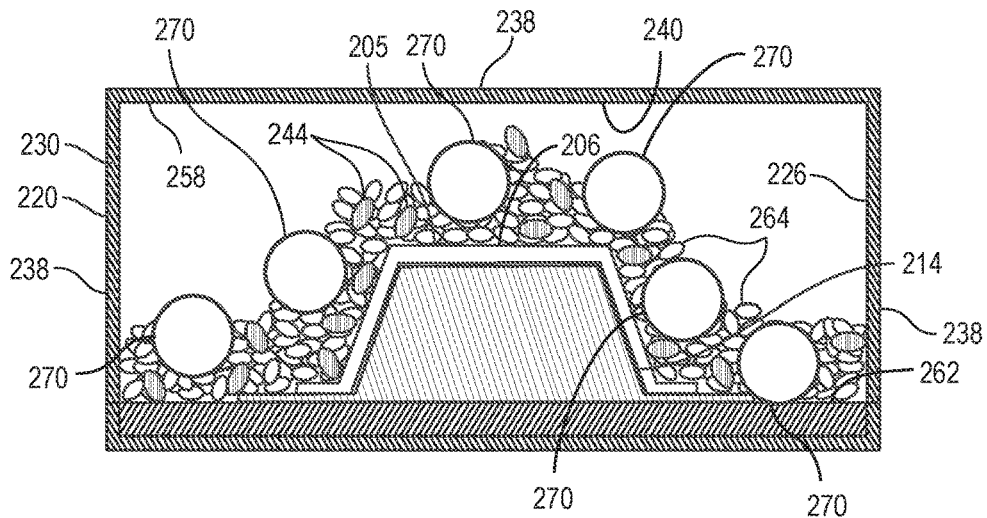
FIG. 20 is a cross-sectional view of an illustrative uncured composite workpiece disposed on a rigid form within an illustrative constraining container with a mixture of heat-generating pellets, thermally expandable pellets, and the addition of an illustrative contractible element.

As shown schematically in FIG. 20, prior to curing workpiece 205, contractible element 270 and unexpanded thermally-expandable pellets 264 are inserted into interior volume 240. The position of contractible element 270 within interior volume 240 can be selected so that some thermally-expandable pellets 264 are disposed between each contractible element and the upper/outer surface of workpiece 205 during curing of the workpiece. If contractible element 270 were instead pushed against portions of workpiece 205 during curing, the contractible element can undesirably deform the workpiece unless it is configured to conform to the walls of constraining container 230 when expanded. Contractible element 270 can provide a surface for thermally-expandable pellets 264 to push against as they expand, which can benefit the distribution of pressure throughout interior volume 240 (e.g., by making the pressure distribution more uniform throughout the volume, and/or within selected portions of the volume).

Figure 21:
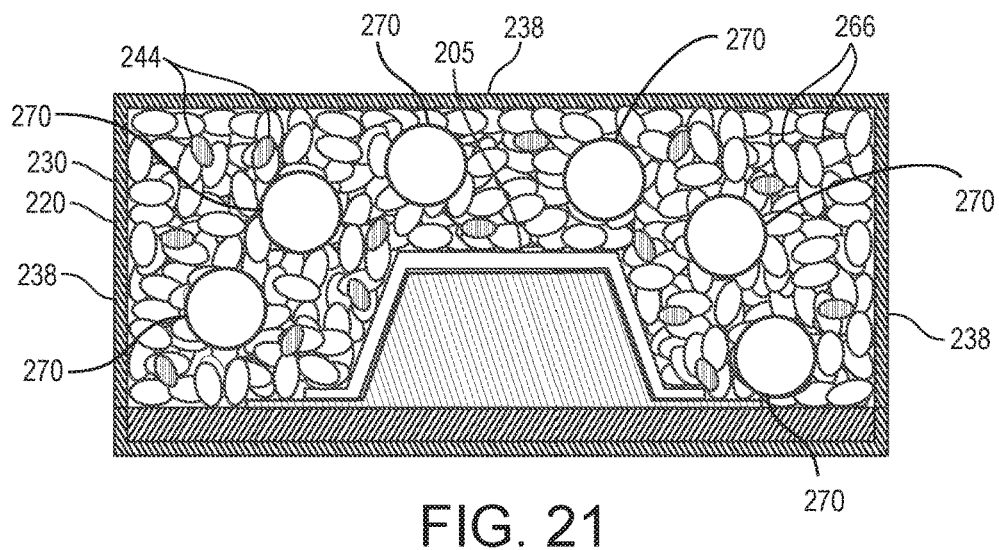
FIG. 21 is the illustrative constraining container of FIG. 20 after expansion of the thermally expandable pellets.

FIG. 21 schematically depicts the constraining container its contents of FIG. 20 after curing and prior to cooling contractible element 270, with pellets 266 having expanded to push against the contractible elements and the upper/outer surfaces of the composite workpiece. During and/or prior to curing of uncured composite workpiece 205, contractible elements 270 can help push thermally-expandable pellets 264 into edge portions, corners, crevices, pockets, and/or narrow portions of interior volume 240. Contractible elements 270 can be configured to expand during the curing process, or to begin the curing process at their maximal volume, and then contract after the curing process is complete.

Figure 22:
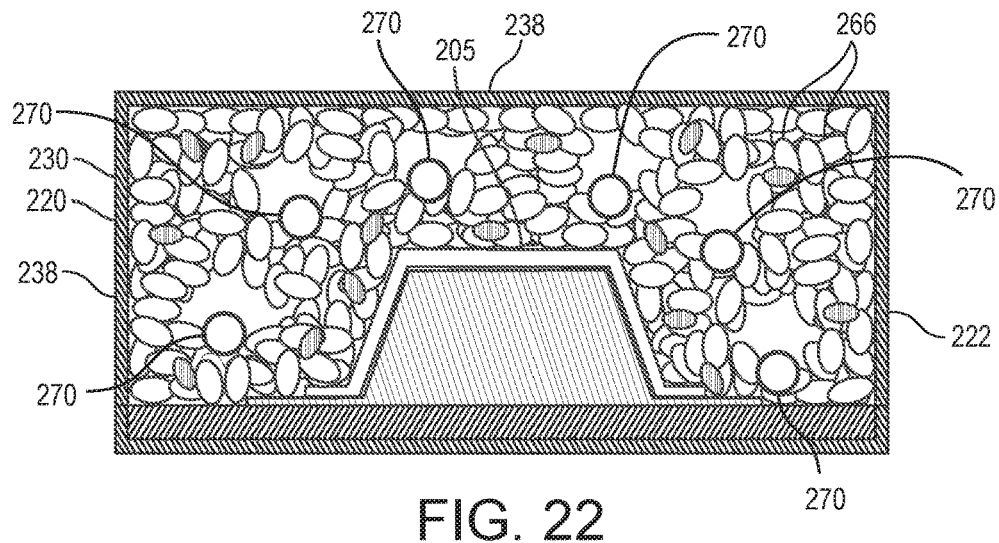
FIG. 22 is the illustrative constraining container of FIG. 21 after contraction of the illustrative contractible element.

FIG. 22 schematically depicts the contents of constraining container 230 of FIG. 20 after curing and after contractible elements 270 have been reduced in volume (e.g., by cooling and/or deflation). Where a contractible element 270 is configured to shrink upon cooling, reducing contractible element 270 in volume can include cooling the contractible element with a cooling mechanism (e.g., one or more fans, water chillers, thermoelectric coolers, etc.). Additionally, or alternatively, contractible element 270 can be allowed to cool naturally toward an ambient temperature. As shown in FIG. 21, when shrunken, contractible element 270 can fit loosely within interior volume 240 and/or within the plurality of expanded pellets 266 within interior volume 240, and therefore can be extracted from the constraining container 230 relatively easily. Typically, contractible element 270 can be removed from constraining container 230 and then the tightly packed expanded pellets 266 are removed. Removing contractible element 270 leaves yet additional space within interior volume 240, allowing expanded pellets 266 to move more easily and therefore to be extracted more easily. Alternatively, contractible element 270 and expanded pellets 266 can be removed substantially simultaneously, or at least some of the pellets can be removed prior to removal of the contractible element.

External surfaces of contractible element 270 can be configured to stick to expanded pellets 266, such that at least some of the expanded pellets 266 are removed from interior volume 240 along with the contractible element 270 when the contractible element is removed from the constraining container 230. For example, surfaces of contractible element 270 can include one or more adhesives, high-friction materials, and/or shapes (e.g., ribbing, indentations, and/or relief patterns) configured to capture one or more expanded pellets 266 such that the captured pellets can be more readily removed along with the contractible element.

Contractible element 270 can include a solid material configured to contract when cooled from a heated curing temperature of the curing process to an ambient or other temperature lower than the curing temperature. For example, contractible element 270 can include a metal material. In examples in which at least a portion of constraining container 230 is elongate, for example in order to accommodate an elongate workpiece, such as an uncured aircraft stiffener workpiece, contractible element 270 can comprise a metal rod positioned longitudinally within interior volume 240. Where contractible element 270 is substantially elongate, the cross-sectional shape of the element can be circular. Additionally, or alternatively, contractible element 270 can have a different cross-sectional shape, such as oblong, square, triangular, hexagonal, polygonal, and/or irregular. Contractible element 270 can be a solid and/or hollow object having a spherical, planar, rectangular, conical, and/or irregular shape.

Figure 23:
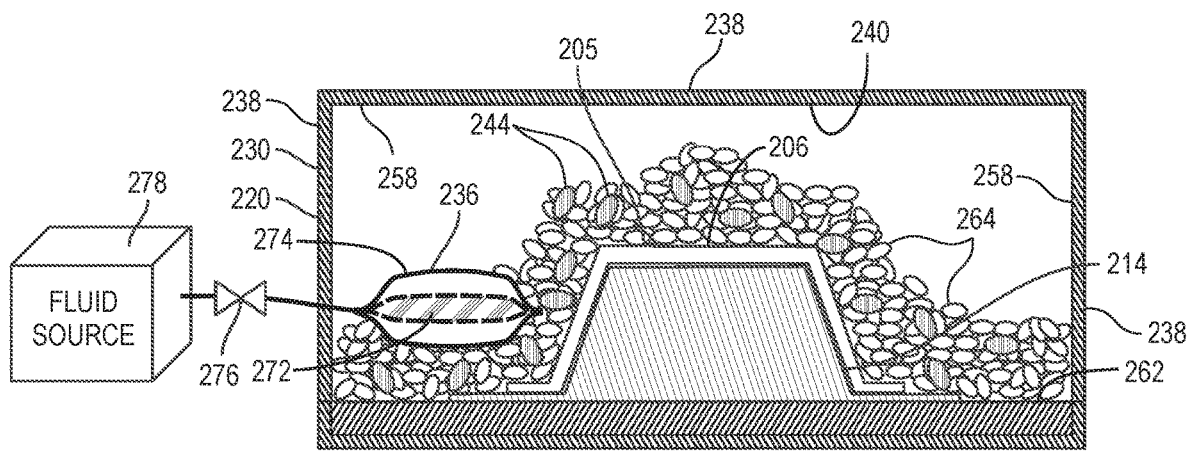
FIG. 23 is a cross-sectional view of an illustrative uncured composite workpiece disposed on a rigid form within an illustrative constraining container with a mixture of heat-generating pellets, thermally expandable pellets, and the addition of an alternative contractible element that includes a bladder.

In an alternative aspect, contractible element 270 can comprise a bladder 236 (see FIG. 23). Bladder 236 (also referred to as a balloon) can contain a fluid 272, and can be configured to be used in conjunction with thermally-expandable pellets 264 in the manner described in the associated description above.

Fluid 272 can be confined within one or more bladder walls 274 comprising an elastic material (e.g., silicone). The constituents of fluid 272 and/or bladder walls 274 can be selected to achieve a desired volume and/or pressure of bladder 236 at the temperatures associated with curing workpiece 205. Fluid 272 can include, without limitation, a liquid, a gas, a super-critical fluid, or a combination thereof. Where contractible element 270 includes a bladder 236, the bladder can be a sealed bladder and fluid 272 contained therein can be configured to expand and contract as the fluid within expands and contracts, and in particular bladder 236 and fluid 272 can be configured as a contractible element 270 such that the volume of bladder 236 can be reduced when cooled from the curing temperature to a lower or ambient temperature.

Alternatively, or in addition, the volume of bladder 236 can be reduced by deflation, such as by puncturing one or more walls 274 of bladder 236. In examples in which bladder 236 is deflated by puncturing, the bladder can be disposable, and/or can be repairable for reuse.

Alternatively, or in addition, bladder 236 can be configured to be opened to allow an input or egress of fluid 272, to control the volume of bladder 236. For example, bladder 236 can be coupled to a valve 276 that can be configured to be closed to retain fluid 272 within bladder 236, opened to allow fluid 272 to exit bladder 236, or alternatively valve 276 can be configured to be in fluid communication with a source 278 of fluid 272, such that additional fluid 272 can be added to bladder 236 to achieve a desired bladder volume.

Fluid source 278 can include a reservoir for holding fluid 272 and/or a pump for pumping fluid 272 into or out of bladder 236. Adjusting the volume and/or pressure of fluid 272 within bladder 236 allows the pressure exerted by bladder 236 on adjacent portions of expandable element 256, thermally-expandable pellets 264, and/or assembly 212 to be selectively adjusted without directly adjusting the temperature of the bladder or the fluid within the bladder.

In one aspect, bladder 236 and/or valve 276 can be configured to not be in fluid communication with fluid source 278 during curing of workpiece 205. For example, bladder 236 can be at least partially filled with fluid 272 and then disconnected from fluid source 278 prior to inserting bladder 236 into interior volume 240 of constraining container 230. Alternatively, or additionally, bladder 236 can be inserted into interior volume 240 and at least partially filled with fluid 272 while inside the container, and then disconnected from fluid source 278 prior to curing workpiece 205.

Although useful as a contractible element, the combination of fluid source 278, valve 276, and bladder 236 can alternatively or additionally be used to supplement the pressure applied by expandable element 256. That is, fluid 272 can be added to bladder 236 to enlarge bladder 236 and apply additional pressure to workpiece 205. Alternatively, or in addition, bladder 236 can be disposed between expandable element 256 and workpiece 205, so that the pressure applied by expandable element 256 is applied more uniformly to workpiece 205.

Bladder 236 can alternatively or additionally be at least partially filled with a foaming agent configured to expand when heated or release a quantity of gas having sufficient pressure and/or volume to apply a predetermined pressure to inner surfaces 258 of constraining container 230. Accordingly, bladder 236 can be an alternative example of an expandable element 256.

Alternatively, or in addition, thermally-expandable pellets 264 can be combined with a plurality of additional pellets that, while also expandable, are configured to expand to a lesser degree than thermally-expandable pellets 264 when heated to a predetermined temperature. Expanding less than thermally-expandable pellets 264 when heated to the predetermined temperature can include substantially not expanding when heated to the predetermined temperature (e.g., having substantially the same volume at the predetermined temperature as at an ambient temperature lower than the predetermined temperature.) For example, the additional pellets can have a coefficient of thermal expansion that is less than ten percent of a coefficient of thermal expansion of the expandable pellets. A mixture of thermally-expandable pellets 264 and such additional pellets can facilitate the extraction of expanded pellets 266 from constraining container 230.

Alternatively, or in addition, thermally-expandable pellets 264 can be combined with a plurality of additional pellets configured to shrink when cooled from the heated curing temperature toward an ambient temperature. Such contractible additional pellets are an example of contractible element 270, described above.

G. Pellet Extraction Systems

In those cases where the geometry of constraining container 230 can hinder the removal of expanded pellets 266, exhausted heat-generating elements, and/or the cured workpiece, a variety of approaches can be employed to facilitate the extraction of pellets 266 from interior volume 240 of constraining container 230, such as using magnetically attractable beads in cooperation with a magnetically attractable bead extraction system. For example, magnetically attractable beads can include steel beads, and a complementary magnetically attractable element to aid in removing the magnetically attractable beads can be a permanent magnet.

Alternatively or in addition, a pressurized fluid extraction system can be employed to extract expanded pellets 266 from constraining container 230. A pressurized fluid extraction system can include a pressurized fluid source configured to force a pressurized fluid into constraining container 230 to flush expanded pellets 266 out of the interior volume 240 of constraining container 230. The pressurized fluid can comprise any suitable fluid, such as an inert gas, air, and/or any other suitable gas or liquid.

Alternatively or in addition, a vacuum extraction system can be configured to extract expanded pellets 266 from interior volume 240 of constraining container 230. A vacuum extraction system can include a vacuum source configured to create a region of low gas pressure and/or partial vacuum adjacent to pull expanded pellets 266 out of constraining container 230, and further include a receptacle configured to collect the expanded pellets.

Alternatively, or in addition, adding the heat-generating element 222, the expandable element 256, or both to the interior volume 240 of the constraining container 230 can include adding a plurality of thermally-expandable pellets 264 to the interior volume 240 of the constraining container while thermally-expandable pellets 264 are retained within flexible bag 224.

In this aspect, thermally-expandable pellets 264 can be prepackaged into portions by placing a predetermined amount of thermally-expandable pellets 264 within a flexible sack or bag 224, where the bags are configured to be added directly to interior volume 240 of constraining container 230. Typically, the composition of bag 224 is selected so that the bag can withstand the conditions under which workpiece 205 is cured, as well as withstanding the internal pressures created upon expansion of thermally-expandable pellets 264.

The principle advantages offered by bagged expandable pellets include the substantially greater simplicity of handling the pellets, both before and after expansion. Bagged thermally-expandable pellets 264 can be more readily portioned out at a job site, and can be more easily transported to where at the job site they are needed. Additionally, the amount of foaming agent included in the expandable pellets or the pre-impregnation of expandable pellets can be metered to a certain dosage, which when combined with metering of bag contents with a known amount of expandable pellets can facilitate calculations for an appropriate amount of thermally-expandable pellets 264, and thereby enhance the production rate of workpiece assembly curing.

Addition of expandable pellets to a constraining container can include adding one or more bags of expandable pellets to the constraining container before container 220 is sealed and the workpiece cured. Then, after curing is complete, the resulting expanded pellets 266 can be readily removed from constraining container 230 by removing the now expanded bags and their contents from the container.

Figure 24:
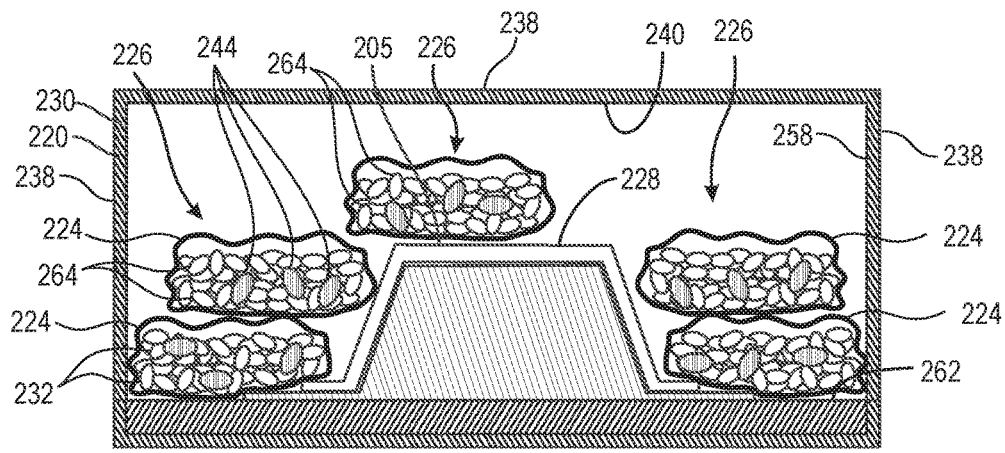
FIG. 24 is a cross-sectional view of an illustrative uncured composite workpiece disposed on a rigid form within an illustrative constraining container with a mixture of heat-generating pellets and thermally expandable pellets retained within multiple bags.

FIG. 24 schematically depicts a plurality of bag assemblies 226, comprising bags 224 that are at least partially filled with thermally-expandable pellets 264. Bag assemblies 226 are shown disposed within constraining container 230 with assembly 212. A variety of bags 224 can be used to construct bag assemblies 226. Such bags 224 can be configured to contain thermally-expandable pellets 264 and/or another type of expandable element 256, and are additionally configured to permit the expandable pellets to expand (e.g., to apply a predetermined pressure to interior surfaces of an internal volume containing the bag, as described above). Bag 224 can be selected so that it simply provides sufficient internal volume that the full expansion of thermally-expandable pellets 264 within bag 224 is accommodated. Alternatively, or in addition, the material of bag 224 can be selected to be partly or wholly expandable (stretchable) itself, so that the expansion of thermally-expandable pellets 264 can be accommodated by bag 224.

Although heat-generating pellets 244 are depicted as being incorporated into bag assemblies 226 in the exemplary system of FIG. 24, an appropriate heat-generating element 222 can alternatively or in addition be added to constraining container 230 outside of, and around, bag assemblies 226.

Figure 25:
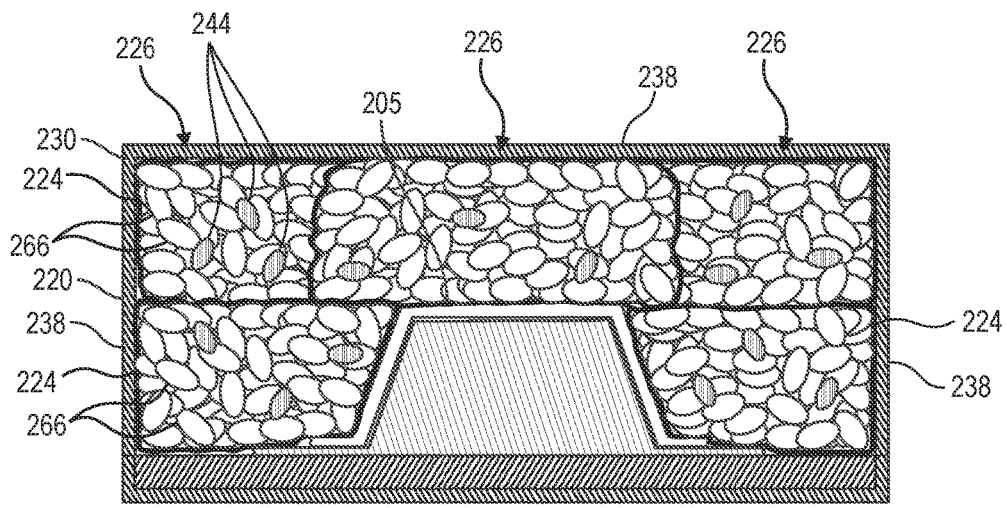
FIG. 25 is a cross-sectional view of the workpiece and constraining container of FIG. 24 after expansion of the expandable pellets within the multiple bags.

FIG. 25 depicts the constraining container 230 of FIG. 24 after workpiece 205 has been cured. Interior volume 240 of constraining container 230 is substantially filled with bag assemblies 226, which comprise bags 224 that now enclose expanded pellets 266. Expanded pellets 266 can be extracted from interior volume 240 of constraining container 230 by opening the container and removing expanded bag assemblies 226 from the container while some or all of the expanded pellets 266 remain contained in bag 224. Where expanded bag assemblies 253 are removed from container 220 intact, with expanded pellets 266 remaining confined within bag 224, no clean-up of spilled or lost pellets is required. However, expanded pellets 266 can alternatively be removed from constraining container 230 by opening one or more bag assemblies 226 and extracting the expanded pellets 266 from bag 224. In order to facilitate the removal of expanded pellets 266 from bag 224, the walls of bag 224 can include a hatch, door, zipper, and/or any other closure assembly configured to be opened and closed again without damaging bag 224.

H. Illustrative Method of Manufacturing a Composite Workpiece

Figure 26:
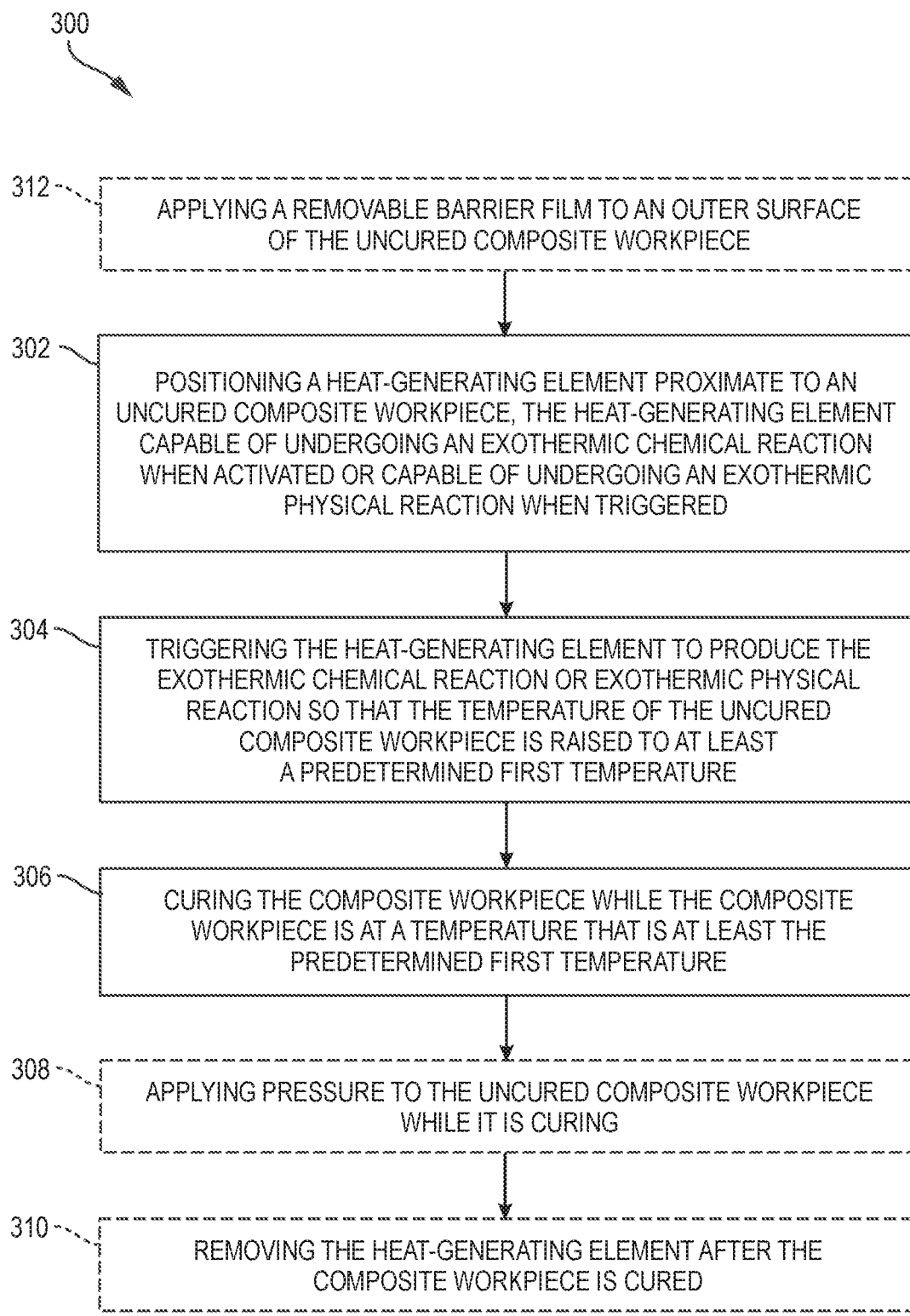
FIG. 26 is a flowchart depicting steps of an illustrative method for manufacturing a composite workpiece.

This section describes steps of an illustrative method of manufacturing a composite workpiece, as shown in flowchart 300 of FIG. 26. Heat-generating element 222, and optionally expandable element 256 and/or associated systems can be utilized in the method steps described below. Where appropriate, reference can be made to components and systems that can be used in carrying out each step. These references are for illustration, and are not intended to limit the possible ways of carrying out any particular step of the method.

FIG. 26 is a flowchart illustrating steps performed in an illustrative method. Based on the present disclosure, it should be understood that additional steps can be performed, without departing from the present claims. Although various steps of flowchart 300 are described below and depicted in FIG. 26, the steps need not necessarily all be performed, and in some cases can be performed simultaneously or in a different order than the order shown.

The present illustrative method can include positioning a heat-generating element proximate to an uncured composite workpiece, the heat-generating element capable of undergoing an exothermic chemical reaction when activated or capable of undergoing an exothermic physical reaction when triggered, as set out at step 302 of flowchart 300. The method can further include triggering the heat-generating element to produce the exothermic chemical reaction or exothermic physical reaction so that the temperature of the uncured composite workpiece is raised to at least a predetermined first temperature, as set out at step 304 of flowchart 300. The method can further include curing the composite workpiece while the composite workpiece is at a temperature that is at least the predetermined first temperature, as set out at step 306 of flowchart 300.

The method described by flowchart 300 can optionally further include applying pressure to the uncured composite workpiece while it is curing, as set out at step 308 of flowchart 300.

The method described by flowchart 300 can optionally further include removing the heat-generating element after the composite workpiece is cured, as set out at step 310 of flowchart 300.

The method described by flowchart 300 can optionally further include applying a removable barrier film to an outer surface of the uncured composite workpiece, as set out at step 312 of flowchart 300.

I. Illustrative Method of Manufacturing a Composite Workpiece

Figure 27:
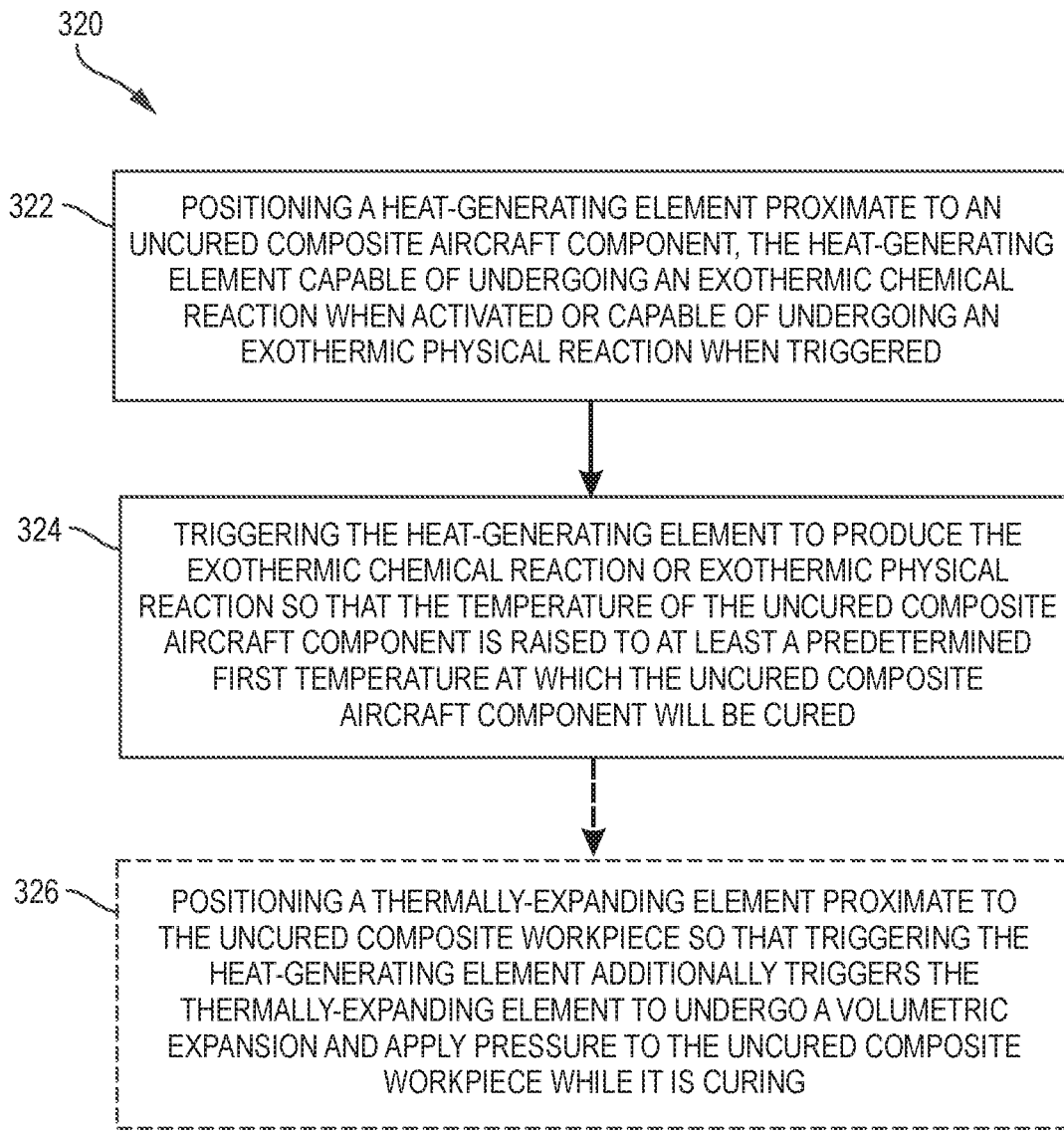
FIG. 27 is a flowchart depicting steps of an alternative illustrative method for manufacturing a composite aircraft component.

This section describes steps of an illustrative method of manufacturing a composite aircraft component, as shown in flowchart 320 of FIG. 27. Heat-generating element 222, expandable element 256, and/or associated systems can be utilized in the method steps described below. Where appropriate, reference can be made to components and systems that can be used in carrying out each step. These references are for illustration, and are not intended to limit the possible ways of carrying out any particular step of the method.

FIG. 27 is a flowchart illustrating steps performed in an illustrative method. Based on the present disclosure, it should be understood that additional steps can be performed, without departing from the present claims. Although various steps of flowchart 320 are described below and depicted in FIG. 27, the steps need not necessarily all be performed, and in some cases can be performed simultaneously or in a different order than the order shown.

The illustrative method of flowchart 320 can include positioning a heat-generating element proximate to an uncured composite aircraft component, the heat-generating element capable of undergoing an exothermic chemical reaction when activated or capable of undergoing an exothermic physical reaction when triggered, as set out at step 322 of flowchart 320. The method can further include triggering the heat-generating element to produce the exothermic chemical reaction or exothermic physical reaction so that the temperature of the uncured composite aircraft component is raised to at least a predetermined first temperature at which the uncured composite aircraft component will be cured, as set out at step 324 of flowchart 320.

The method described by flowchart 320 can optionally further include positioning a thermally-expanding element proximate to the uncured composite workpiece so that triggering the heat-generating element additionally triggers the thermally-expanding element to undergo a volumetric expansion and apply pressure to the uncured composite workpiece while it is curing, as set out at step 326 of flowchart 320.

Illustrative Combinations and Additional Examples

This section describes additional aspects and features of heat-generating tooling, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A method of manufacturing a composite workpiece, comprising positioning a heat-generating element proximate to an uncured composite workpiece, the heat-generating element capable of undergoing an exothermic chemical reaction when activated or capable of undergoing an exothermic physical reaction when triggered, triggering the heat-generating element to produce the exothermic chemical reaction or exothermic physical reaction so that the temperature of the uncured composite workpiece is raised to at least a predetermined first temperature, and curing the uncured composite workpiece while the uncured composite workpiece is at a temperature that is at least the predetermined first temperature.

A2. The method of paragraph A1, further comprising applying pressure to the uncured composite workpiece while it is curing.

A3. The method of paragraph A2, wherein positioning the heat-generating element proximate to the uncured composite workpiece includes positioning a mixture of the heat-generating element and a thermally-expanding element proximate to the uncured composite workpiece, triggering the heat-generating element includes triggering the thermally-expanding element to undergo a volumetric expansion, and applying pressure to the uncured composite workpiece while it is curing includes constraining a volume around the uncured composite workpiece so that triggering the thermally-expanding element applies at least a predetermined pressure to the composite workpiece during curing.

A4. The method of paragraph A3, wherein the thermally-expanding element includes a plurality of expandable pellets configured to expand collectively to produce the predetermined pressure against a surface of the uncured composite workpiece when heated to the predetermined first temperature.

A5. The method of paragraph A3, wherein the heat-generating element and the thermally-expanding element are combined in a plurality of heat-generating pellets and expandable pellets that are configured to expand collectively to produce the predetermined pressure against a surface of the uncured composite workpiece when heated by triggering the heat-generating element.

A6. The method of any of paragraphs A1-A5, wherein positioning the heat-generating element proximate to the uncured composite workpiece includes positioning a heat-generating element configured to undergo an exothermic physical reaction that is a change of state; and triggering the heat-generating element includes triggering the exothermic change of state.

A7. The method of any of paragraphs A1-A5, wherein positioning the heat-generating element proximate to the uncured composite workpiece includes positioning a heat-generating element configured to undergo an exothermic chemical reaction; and triggering the heat-generating element includes triggering the exothermic chemical reaction.

A8. The method of any of paragraph A1-A5, wherein positioning the heat-generating element proximate to the uncured composite workpiece includes positioning a mixture of the heat-generating element and a heating mediation agent proximate to the uncured composite workpiece.

A9. The method of paragraph A8, wherein the heating mediation agent is selected to be capable of undergoing an endothermic physical reaction, or capable of undergoing an endothermic chemical reaction, so that the heating mediation agent decreases a maximum temperature reached proximate the composite workpiece after triggering the heat-generating element.

A10. The method of any of paragraphs A1-A9, further comprising removing the heat-generating element after the composite workpiece is cured.

A11. The method of paragraph A10, wherein removing the heat-generating element includes cooling the heat-generating element to a second temperature lower than the predetermined first temperature, or allowing the heat-generating element to cool to a second temperature lower than the predetermined first temperature.

A12. The method of any of paragraphs A1-A11, further comprising applying a removable barrier film to an outer surface of the uncured composite workpiece before positioning the heat-generating element proximate to the uncured composite workpiece.

A13. The method of any of paragraphs A1-A12, wherein the heat-generating element has the form of a plurality of pellets.

A14. The method of paragraph A13, wherein the plurality of pellets forming the heat-generating element is not substantially sintered after the heat-generating element is triggered.

A15. The method of paragraph A13, wherein the plurality of pellets are contained within one or more flexible bags, and positioning the heat-generating element proximate to the uncured composite workpiece includes positioning the one or more flexible bags proximate to the uncured composite workpiece.

A16. The method of paragraph A15, wherein the one or more flexible bags optionally further include a pelletized heating mediation agent and/or a pelletized thermally-expanding element; and positioning the heat-generating element proximate to the uncured composite workpiece includes placing one or more such flexible bags proximate to the uncured composite workpiece.

A17. A cured composite workpiece prepared according to the method of paragraph A1.

B1. A method of manufacturing a composite aircraft component, comprising positioning a heat-generating element proximate to an uncured composite aircraft component, the heat-generating element capable of undergoing an exothermic chemical reaction when activated or capable of undergoing an exothermic physical reaction when triggered, and triggering the heat-generating element to produce the exothermic chemical reaction or exothermic physical reaction so that the temperature of the uncured composite aircraft component is raised to at least a predetermined first temperature at which the uncured composite aircraft component will be cured.

B2. The method of paragraph B1, further comprising positioning a thermally-expanding element proximate to the uncured composite workpiece so that triggering the heat-generating element additionally triggers the thermally-expanding element to undergo a volumetric expansion and apply pressure to the uncured composite workpiece while it is curing.

B3. The method of one of paragraphs B1 and B2, wherein the heat-generating element is pelletized, and positioning the heat-generating element proximate to the uncured composite aircraft component includes placing one or more flexible bags containing the pelletized heat-generating element proximate to the uncured composite aircraft component.

B4. The method of paragraph B3, the one or more flexible bags further include a pelletized heating mediation agent and/or a pelletized thermally-expanding element.

B5. A cured composite aircraft component prepared according to the method of paragraph B1.

Advantages, Features, and Benefits

The different examples of the heat-generating tooling systems and methods described herein provide several advantages over known solutions for curing composite workpieces. For example, illustrative examples described herein allow tooling that is adaptive to various shapes, and typically does not need to be tailored to specific dimensions and/or geometry of the composite workpiece assembly. Furthermore, illustrative embodiments and examples described herein allow for manufacturing composite parts having a complicated shape, without manufacturing custom tooling having a corresponding complicated shape. Accordingly, the high cost of manufacturing the complicated tooling is saved.

Additionally, and among other benefits, illustrative examples described herein allow tooling that is tailorable to the pressure and temperatures associated with curing a specific composite workpiece assembly.

Additionally, and among other benefits, illustrative examples described herein allow tooling that is environmentally preferred. For example, expandable foam pellets can comprise a recyclable material such as polyethylene terephthalate (PET), a material from renewable resources, and/or a biodegradable material such as polylactide (PLA).

Additionally, and among other benefits, the expandable tooling systems and methods described herein facilitates the "out-of-autoclave" curing of composite workpieces. Appropriate constraining containers can be fabricated on site for conducting the present methods at a desired location, saving on the cost of providing an industrial oven, the cost of transporting workpieces to and from the industrial oven, and preventing the types of bottlenecks in production flow that can typically result when production resources are limited in number but widely required.

No known system or device can perform these functions. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of manufacturing a composite workpiece, the method comprising:
    positioning a heat-generating element and a plurality of thermally expandable pellets proximate to an uncured composite workpiece, the heat-generating element being capable of undergoing an exothermic chemical reaction or an exothermic physical reaction when triggered, the plurality of thermally expandable pellets being configured to soften and undergo volumetric expansion by foaming when heated to a predetermined first temperature;
    constraining a volume around the uncured composite workpiece;
    triggering the heat-generating element to produce the exothermic chemical reaction or the exothermic physical reaction so that a temperature of the uncured composite workpiece and the plurality of thermally expandable pellets is raised to at least the predetermined first temperature, and so that the plurality of thermally expandable pellets undergoes the volumetric expansion by foaming to apply at least a predetermined pressure to the composite workpiece; and
    curing the composite workpiece while the composite workpiece is at a temperature that is at least the predetermined first temperature and while at least the predetermined pressure is applied to the composite workpiece.

2. The method of claim 1, wherein positioning includes positioning a mixture of the heat-generating element and the plurality of thermally expandable pellets proximate to the uncured composite workpiece.

3. The method of claim 1, wherein positioning the heat-generating element proximate to the uncured composite workpiece includes positioning a heat-generating element configured to undergo an exothermic physical reaction that is an exothermic change of state; and triggering the heat-generating element includes triggering the exothermic change of state.

4. The method of claim 1, wherein positioning the heat-generating element proximate to the uncured composite workpiece includes positioning a heat-generating element configured to undergo an exothermic chemical reaction; and triggering the heat-generating element includes triggering the exothermic chemical reaction.

5. The method of claim 1, wherein positioning the heat-generating element proximate to the uncured composite workpiece includes positioning a mixture of the heat-generating element and a heating mediation agent proximate to the uncured composite workpiece, and wherein the heating mediation agent undergoes an endothermic physical reaction or an endothermic chemical reaction to decrease a maximum temperature reached proximate the composite workpiece after triggering the heat-generating element.

6. The method of claim 1, further comprising removing the heat-generating element after the composite workpiece is cured.

7. The method of claim 6, wherein removing the heat-generating element includes cooling the heat-generating element to a second temperature lower than the predetermined first temperature, or allowing the heat-generating element to cool to a second temperature lower than the predetermined first temperature.

8. The method of claim 1, further comprising applying a removable barrier film to an outer surface of the uncured composite workpiece before positioning the heat-generating element proximate to the uncured composite workpiece.

9. The method of claim 1, wherein the heat-generating element has the form of a plurality of pellets.

10. The method of claim 9, wherein the plurality of pellets forming the heat-generating element is not substantially sintered after the heat-generating element is triggered.

11. The method of claim 9, wherein the plurality of pellets forming the heat-generating element are contained within one or more flexible bags, and positioning the heat-generating element proximate to the uncured composite workpiece includes positioning the one or more flexible bags proximate to the uncured composite workpiece.

12. The method of claim 11, wherein the one or more flexible bags further contain a pelletized heating mediation agent and/or the plurality of thermally expandable pellets; and positioning the heat-generating element proximate to the uncured composite workpiece includes placing one or more such flexible bags proximate to the uncured composite workpiece.

13. The method of claim 1, wherein constraining is performed using a constraining container, and wherein thermally expandable pellets of the plurality of thermally expandable pellets are in direct contact with a wall of the constraining container after the plurality of thermally expandable pellets have undergone the volumetric expansion by foaming.

14. The method of claim 1, wherein positioning includes disposing the heat-generating element above, beneath, and around the uncured composite workpiece.

15. The method of claim 14, wherein the heat-generating element includes a plurality of heat-generating pellets, and wherein positioning includes disposing the plurality of heat-generating pellets above, beneath, and around the uncured composite workpiece.

16. The method of claim 1, wherein the plurality of thermally expandable pellets includes a thermoplastic material having a glass transition temperature and a melting temperature, and wherein triggering includes heating the plurality of thermally expandable pellets to a maximum temperature that is above the glass transition temperature and below the melting temperature.

17. A method of manufacturing a composite aircraft component, the method comprising:
    positioning a mixture of a heat-generating element and a heating mediation agent proximate to an uncured composite aircraft component, the heat-generating element being capable of undergoing an exothermic chemical reaction or an exothermic physical reaction when triggered; and
    triggering the heat-generating element to produce the exothermic chemical reaction or the exothermic physical reaction so that a temperature of the uncured composite aircraft component is raised to at least a predetermined first temperature at which the uncured composite aircraft component will be cured; and wherein the heating mediation agent undergoes an endothermic physical reaction or an endothermic chemical reaction to decrease a maximum temperature reached proximate the composite aircraft component after triggering the heat-generating element.

18. The method of claim 17, further comprising positioning a thermally-expanding element proximate to the uncured composite aircraft component so that triggering the heat-generating element additionally triggers the thermally-expanding element to undergo a volumetric expansion and apply pressure to the uncured composite aircraft component while it is curing.

19. The method of claim 17, wherein the heat-generating element is pelletized, and positioning the heat-generating element proximate to the uncured composite aircraft component includes placing one or more flexible bags containing the pelletized heat-generating element proximate to the uncured composite aircraft component.

20. The method of claim 19, the one or more flexible bags further include a pelletized heating mediation agent and/or a pelletized thermally-expanding element.

\* \* \* \* \*